US 6,907,407 B1

(12) United States Patent
Yamanoue et al.

(10) Patent No.: US 6,907,407 B1
(45) Date of Patent: Jun. 14, 2005

(54) COPYRIGHT MANAGEMENT APPARATUS

(75) Inventors: Masafumi Yamanoue, Nara (JP);
Keisuke Iwasaki, Nara (JP); Yoshihiro Kitamura, Osaka (JP); Yuji Sawada, Osaka (JP); Katsuhiko Sato, Nara (JP);
Masashi Hirosawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/720,791

(22) PCT Filed: Jun. 30, 1999

(86) PCT No.: PCT/JP99/03513

§ 371 (c)(1),
(2), (4) Date: Dec. 29, 2000

(87) PCT Pub. No.: WO00/02171

PCT Pub. Date: Jan. 13, 2000

(30) Foreign Application Priority Data

Jul. 2, 1998 (JP) .......................................... 10/187056
Jul. 2, 1998 (JP) .......................................... 10/187057

(51) Int. Cl.[7] ............................................. G06F 17/60
(52) U.S. Cl. ............................. 705/57; 705/50; 705/51; 705/52; 705/59
(58) Field of Search ....................... 705/50–59; 709/229

(56) References Cited

U.S. PATENT DOCUMENTS

| 5,532,920 A | | 7/1996 | Hartrick et al. | |
|---|---|---|---|---|
| 5,832,083 A | * | 11/1998 | Iwayama et al. | ............. 705/51 |
| 6,073,122 A | * | 6/2000 | Wool | ........................... 705/51 |
| 6,560,651 B2 | * | 5/2003 | Katz et al. | ................. 709/229 |
| 2002/0002466 A1 | * | 1/2002 | Kambayashi et al. | .......... 705/1 |
| 2002/0196364 A1 | * | 12/2002 | Hendricks | ................... 348/468 |
| 2003/0191719 A1 | * | 10/2003 | Ginter et al. | ................. 705/54 |

FOREIGN PATENT DOCUMENTS

| EP | 0 309 298 A | 3/1989 |
|---|---|---|
| EP | 0 567 800 A | 11/1993 |

(Continued)

OTHER PUBLICATIONS

Griffith, Cary, "Five advantages of electronic books", Information Today, Mar. 1995. vol. 12, Iss. (3 pages).*
ANonymous, "Book on the World Wide Web: Issues and trends", Information Today, Jun. 1998, vol. 16, Iss. 6/7 (4 pages).*

Primary Examiner—James P. Trammell
Assistant Examiner—Jalatee Worjloh
(74) Attorney, Agent, or Firm—Birch, Stewart, Kolasch & Birch, LLP

(57) ABSTRACT

An electronic copyrighted work distribution management system includes an electronic copyrighted work sales apparatus selling an electronic copyrighted work, a copyright management apparatus administering a copyright royalty of an electronic copyrighted work sold by the electronic copyrighted work sales apparatus, a seller terminal used by a seller, and a copyright terminal used by a copyright holder. The electronic copyrighted work sales apparatus calculates and transmits to the copyright management apparatus the copyright royalty of a selected electronic copyrighted work. The copyright management apparatus stores the received copyright royalty data for each copyright holder. Since the copyright management apparatus receives and stores for each copyright holder the copyright royalty data transmitted from the electronic copyrighted work sales apparatus, the copyright royalty can be administered.

17 Claims, 22 Drawing Sheets

FOREIGN PATENT DOCUMENTS

| | | |
|---|---|---|
| JP | 62145495 | 6/1987 |
| JP | 62277855 | 12/1987 |
| JP | 2234296 | 9/1990 |
| JP | 5048996 | 2/1993 |
| JP | 5089360 | 4/1993 |
| JP | 5122701 | 5/1993 |
| JP | 05-174379 A | 7/1993 |
| JP | 6162329 | 6/1994 |
| JP | 07-319684 A | 12/1995 |
| JP | 10-177674 A | 6/1998 |
| JP | 11-283327 A | 10/1999 |
| WO | WO 96/27155 A2 | 9/1996 |
| WO | 98/42098 A | 9/1998 |

\* cited by examiner

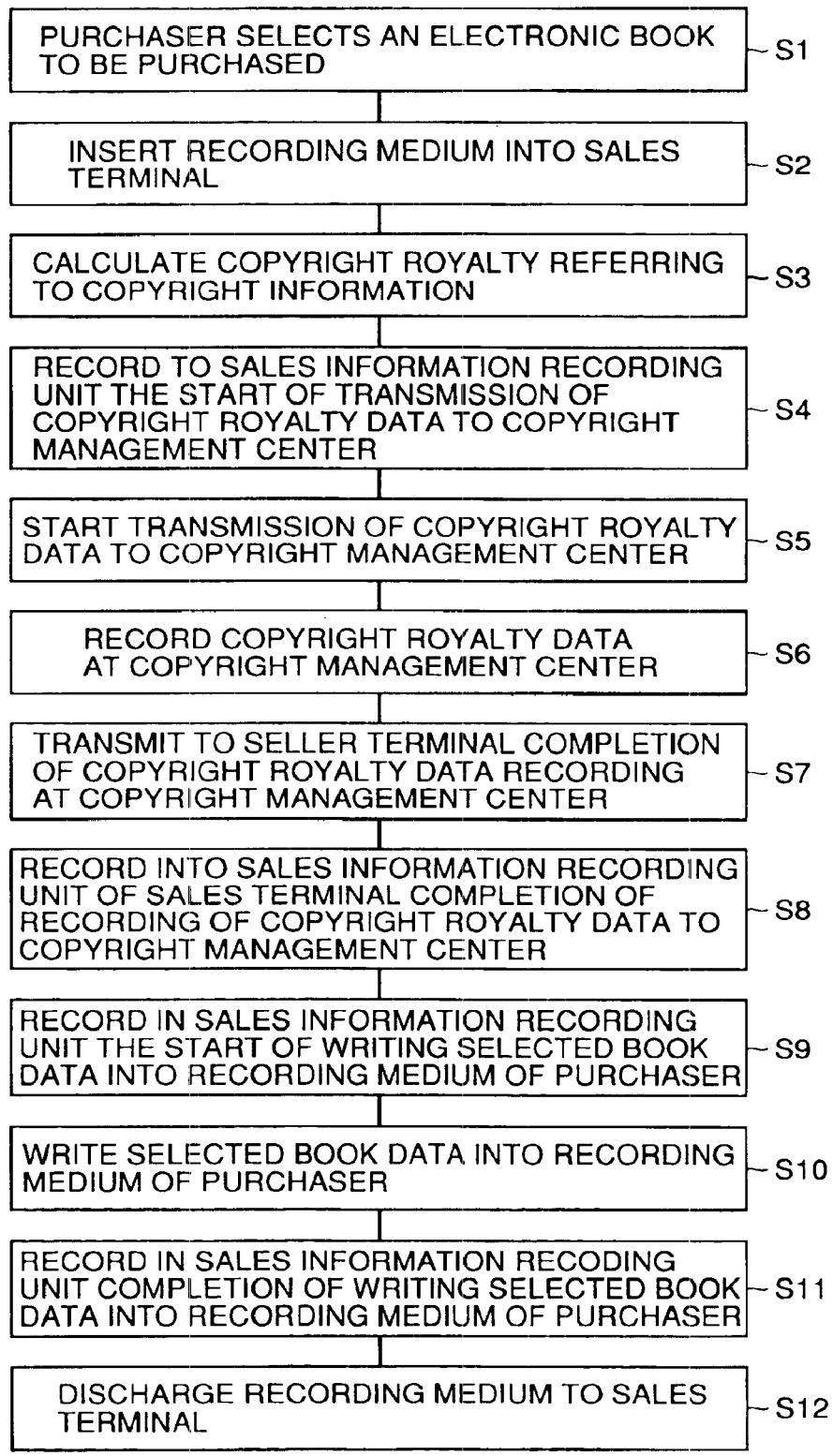

*FIG.3A*

| BOOK 1-ID |
|---|
| DOCUMENT INFORMATION 1 |
| COPYRIGHT HOLDER A-ID |
| COPYRIGHT ROYALTY INFORMATION A1 |
| BOOK DATA A1 |

*FIG.3B*

| BOOK 2-ID |
|---|
| DOCUMENT INFORMATION 2 |
| COPYRIGHT HOLDER A-ID |
| COPYRIGHT ROYALTY INFORMATION A2 |
| BOOK DATA A2 |
| COPYRIGHT HOLDER B-ID |
| COPYRIGHT ROYALTY INFORMATION B2 |
| BOOK DATA B2 |
| : |

*FIG.3C*

| BOOK 3-ID |
|---|
| DOCUMENT INFORMATION 3 |
| COPYRIGHT HOLDER A-ID |
| COPYRIGHT ROYALTY INFORMATION A3a |
| BOOK DATA A3a |
| COPYRIGHT HOLDER A-ID |
| COPYRIGHT ROYALTY INFORMATION A3b |
| BOOK DATA A3b |
| : |

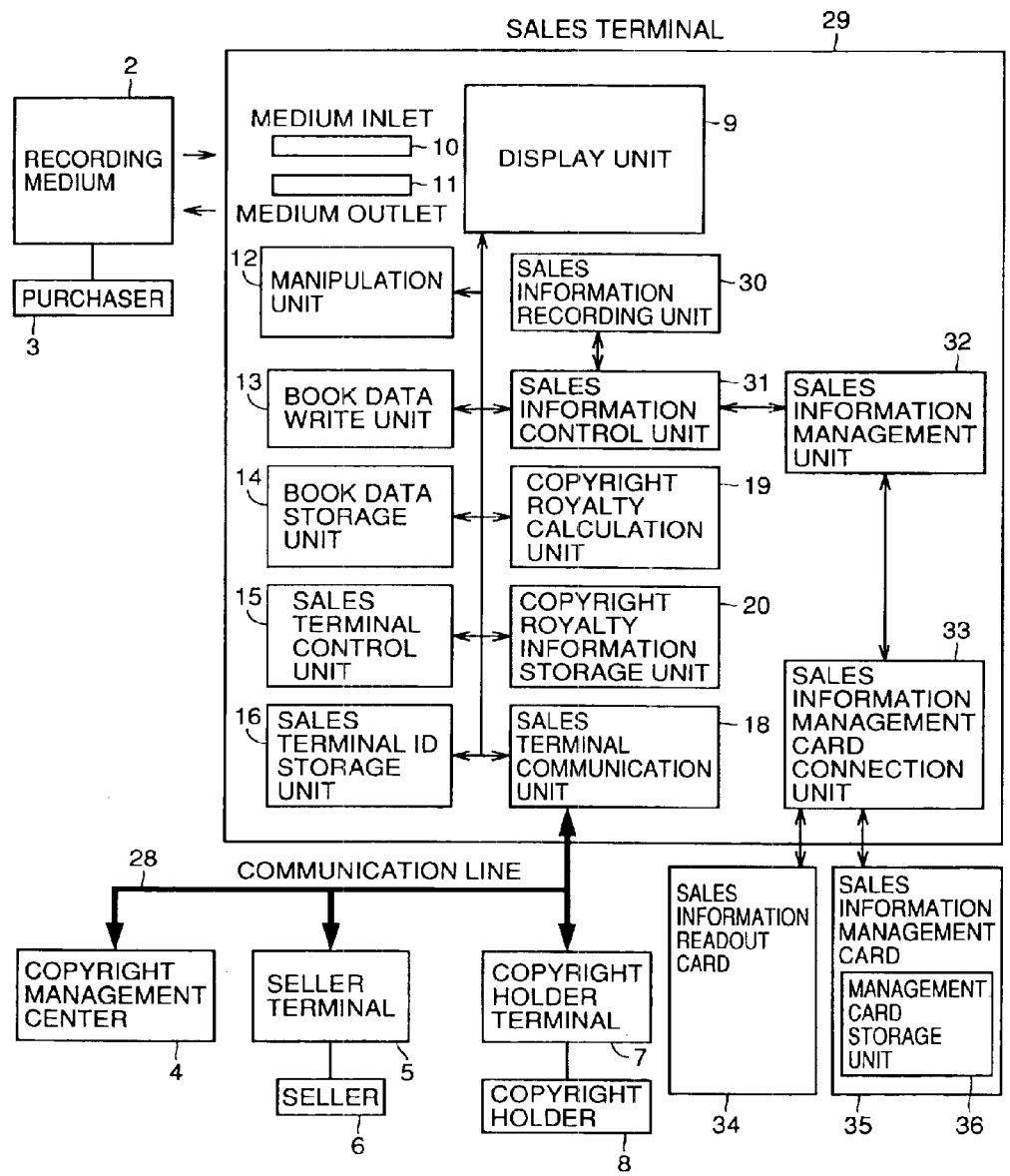

| DISPLAY FORMAT | NUMBER OF LCDs | LCD NUMBER OF PIXELS (X×Y) | LCD COLOR | DISPLAYED DIRECTION | NUMBER OF PAGES |
|---|---|---|---|---|---|
| (a) | 2 | 768×1024 | MONOCHROME 8 TONES | VERTICAL | 1 |
| (b) | 1 | 768×1024 | MONOCHROME 8 TONES | VERTICAL | 1 |
| (c) | 1 | 768×1024 | MONOCHROME 8 TONES | HORIZONTAL | 2 |
| (d) | 1 | 480×640 | 260,000 COLORS | VERTICAL | 1 |

FIG. 17

| | | |
|---|---|---|
| IMAGE | IMAGE DATA STARTING DELIMITER | 1002 |
| 1 | IMAGE DATA ID NUMBER | 1003 |
| MH | COMPRESSION METHOD IDENTIFIER OF IMAGE DATA | 1004 |
| CONTENTS KEY 1 | CONTENTS KEY TYPE USED FOR PROCESS | 1005 |
| NONE | PROCESSING TABLE ID TO BE USED | 1006 |
| ENCODED IMAGE DATA | COMPRESSED IMAGE DATA | 1007 |
| /IMAGE | IMAGE DATA ENDING DELIMITER | 1008 |
| TABLE | PROCESSING TABLE STARTING DELIMITER | 1009 |
| 1 | TABLE ID NUMBER | |
| CONTENTS KEY 2 | KEY TYPE TO DECODE TABLE DATA | |
| TABLE DATA | | |
| /TABLE | PROCESSING TABLE ENDING DELIMITER | |
| MODULE | MODULE PROCESSING STARTING DELIMITER | |
| CAOS | MODULE NAME | |
| CONTENTS KEY 3 | KEY TYPE TO DECODE MODULE DATA | |
| ENCODE PROCESS MODULE | | |
| /MODULE | MODULE PROCESS ENDING DELIMITER | |
| PAGE | PAGE STARTING DELIMITER | |
| 768 | PAGE WIDTH IN PIXELS | |
| 1024 | PAGE HEIGHT IN PIXELS | |
| IMAGE | IMAGE DATA STARTING DELIMITER | |
| 2 | IMAGE DATA ID NUMBER | |
| JBIG | COMPRESSION METHOD IDENTIFIER OF IMAGE DATA | |
| 768×1024 | NUMBER OF DISPLAYABLE PIXELS (x×y) | |
| CONTENTS KEY 2 | CONTENTS KEY TYPE USED IN PROCESS | |
| IMAGE DATA | | |
| /IMAGE | IMAGE DATA ENDING DELIMITER | |
| IMAGE | IMAGE DATA STARTING DELIMITER | |
| 2 | IMAGE DATA ID NUMBER | |
| JBIG | COMPRESSION METHOD IDENTIFIER OF IMAGE DATA | |
| 480×640 | NUMBER OF DISPLAYABLE PIXELS (x×y) | |
| CONTENTS KEY 2 | CONTENTS KEY TYPE USED IN PROCESS | |
| ENCODED IMAGE DATA | | |
| /IMAGE | IMAGE DATA ENDING DELIMITER | |
| IMAGE | IMAGE DATA STARTING DELIMITER | |
| 3 | IMAGE DATA ID NUMBER | |
| JPEG | COMPRESSION METHOD IDENTIFIER OF IMAGE DATA | |
| CONTENTS KEY 3 | CONTENTS KEY TYPE USED IN PROCESS | |
| ENCODED IMAGE DATA | | |
| /IMAGE | IMAGE DATA ENDING DELIMITER | |

STEP 1
STEP 2
STEP 3
STEP 4
STEP 5
STEP 6
STEP 7

FIG. 18

| Value | Description | Step |
|---|---|---|
| PUTIMAGE | IMAGE DRAW PROCESS STARTING DELIMITER | |
| 1 | IMAGE DATA ID | |
| 1 | ID NUMBER OF TABLE TO BE USED | |
| 1 | ID NUMBER OF TABLE INTERNAL PROCESS | |
| CONTENTS KEY 2 | | |
| 0 | SOURCE X COORDINATE Xso | |
| 0 | SOURCE Y COORDINATE Yso | STEP 8 |
| 100 | SOURCE RECTANGLE WIDTH IN PIXELS DXs | |
| 100 | SOURCE RECTANGLE HEIGHT IN PIXELS DYs | |
| 120 | DESTINATION X COORDINATE Xdo | |
| 150 | DESTINATION Y COORDINATE Ydo | |
| 100 | DESTINATION RECTANGLE WIDTH IN PIXELS DXd | |
| 100 | DESTINATION RECTANGLE HEIGHT IN PIXELS DYd | |
| /PUTIMAGE | IMAGE DRAW PROCESS ENDING DELIMITER | |
| BLUR | IMAGE BLUR PROCESS STARTING DELIMITER | |
| 3 | IMAGE DATA ID | |
| CONTENTS KEY 4 | | |
| 3 | NUMBER OF SECONDS OF PROCESS START | |
| 1 | TERM OF PROCESS REPETITION (SECONDS) | |
| 10 | NUMBER OF REPETITIONS | |
| 3 | BLUR RECTANGLE SIZE | |
| 100 | SOURCE X COORDINATE Xso | |
| 100 | SOURCE Y COORDINATE Yso | STEP 9 |
| 64 | SOURCE RECTANGLE WIDTH IN PIXELS DX | |
| 64 | SOURCE RECTANGLE HEIGHT IN PIXELS DY | |
| 530 | DESTINATION X COORDINATE Xdo | |
| 540 | DESTINATION Y COORDINATE Ydo | |
| 64 | DESTINATION RECTANGLE WIDTH IN PIXELS DXd | |
| 64 | DESTINATION RECTANGLE HEIGHT IN PIXELS DYd | |
| /BLUR | IMAGE BLUR PROCESS ENDING DELIMITER | |
| CAOS | CHAOS PROCESS STARTING DELIMITER | |
| 2 | ID OF IMAGE DATA TO BE DRAWN | |
| CONTENTS KEY 3 | | |
| 0 | SOURCE X COORDINATE Xso | |
| 0 | SOURCE Y COORDINATE Yso | |
| 100 | SOURCE RECTANGLE WIDTH IN PIXELS DX | |
| 100 | SOURCE RECTANGLE HEIGHT IN PIXELS DY | |
| 120 | DESTINATION X COORDINATE Xdo | STEP 10 |
| 150 | DESTINATION Y COORDINATE Ydo | |
| 100 | DESTINATION RECTANGLE WIDTH IN PIXELS DXd | |
| 100 | DESTINATION RECTANGLE HEIGHT IN PIXELS DYd | |
| 10 | NUMBER OF REPETITIONS | |
| 0.8 | INITIAL VALUE A | |
| 3.8 | PROCESS PARAMETER P | |
| /CAOS | CHAOS PROCESS ENDING DELIMITER | |
| : | | |
| /PAGE | PAGE ENDING DELIMITER | |
| PAGE | | |
| : | | |
| /PAGE | | |

FIG.19

| PROCESS ID | MAGNIFICATION PROCESS | SHRINK PROCESS | RECUDING NUMBER OF COLORS |
|---|---|---|---|
| 1 | EDGE ENHANCEMENT AFTER BI-LINEAR INTERPOLATION | SIMPLE SHRINK | BIT SLICE |
| 2 | SIMPLE MAGNIFICATION | SIMPLE SHRINK | ERROR DIFFUSION |
| 3 | BI-LINEAR INTERPOLATION | BI-LINEAR INTERPOLATION | BIT SLICE |

COPYRIGHT MANAGEMENT APPARATUS

This application is the national phase under 35 U.S.C. § 371 of PCT International Application No. PCT/JP99/03513 which has an International filing date of Jun. 30, 1999, which designated the United States of America.

TECHNICAL FIELD

The present invention relates to the art of administering distribution of electronic copyrighted work such as electronic books and displaying such copyrighted work. Particularly, the present invention relates to a copyright management apparatus administering the copyright royalty associated with the sales of an electronic book, an electronic copyrighted work sales apparatus providing contents of an encoded electronic book to the user, an electronic book sales apparatus providing contents of an encoded electronic book to the user, an electronic book display apparatus decoding and displaying the contents of the encoded electronic book, a key information management apparatus administering for every user the key information that is required in decoding the contents of an electronic book, and an electronic copyrighted work distribution management system connecting these apparatuses through a communication line.

BACKGROUND ART

Sales of books based on paper as the medium has been carried out widely from the past. In publishing a book, a predetermined number of copies corresponding to the expected sales of that book are printed and distributed at bookshops and the like by the distribution system. The book is placed at the store to be sold. These books become the stock at each bookshop until it is sold. When the book is not sold within a predetermined period of time, the book may be returned to the publisher that is the origin of the sales.

It is difficult for the publisher to accurately grasp the number of books sold and the number of books in stock at each bookshop. A copyright royalty fee corresponding to a rough estimate of the number of sold copies indicated by the publisher was paid to the copyright holder. Therefore, the proper copyright royalty fee was not always paid to the copyright holder.

Recently, copyrightable objects such as books and the like have been converted into electronic form to be distributed on the market in a manner similar to that of software. Since the process of printing out the copyrighted work is not carried out, it has become difficult for the copyright holder to identify the number of copies sold. It is now becoming more difficult for the copyright holder to obtain the proper copyright royalty fee.

The invention in Japanese Patent Laying-Open No. 5-89360 discloses technique related thereto. The automatic sales system of the software disclosed in this Japanese Patent Laying-Open No. 5-89360 includes an IC (Integrated Circuit) memory card with a ROM (Read Only Memory) storing the card ID (identification) number and user ID number and a readable/writable RAM (random access memory), an automatic vending device incorporating a telephone line and a storage device in which a plurality of software are stored, and an approval center having a telephone line connected to assign an approval number of a copyright. A purchaser selects the software he/she wishes to purchase and obtains an approval number from the approval center through the telephone line, whereby the automatic vending device loads the software in the storage device into the RAM of the IC memory card.

By centralizing the amount of sold software through the approval center, the copyright holder can identify the number of software sold. However, there is a problem from the standpoint of security control since the approval center and the automatic vending device are connected via a telephone line. In other words, there is a possibility that the sales information and the like may leak out by illegal access from the automatic vending machine connected to the telephone line.

In order to prevent the software from being obtained illegally from the automatic vending device, the card ID number and the user's ID number are stored in the IC memory card. In the case where a user purchases software from the automatic vending device, information of that purchase will remain. A problem may occur from the standpoint of protecting privacy. Furthermore, since the purchaser must obtain the software by means of a certain card in which the user's ID number and the like are registered, the anonymity of the purchaser is exposed to discourage the volition of purchase.

In the case where the person who has installed the automatic vending device has control on the automatic vending device, the installer may conduct illegal sales of the copyrighted work such as software through the automatic vending device or falsify the number of sales. Thus, there was a problem that the proper copyright royalty fee may not be paid to the copyright holder.

In the case where a user purchases a copyrighted work such as software from the automatic vending device, time is required for the operation to write into a recording medium the electronic copyrighted work after selection thereof as well as the time required for the procedure for approval to purchase a copyrighted work. As a result, there was a problem that the automatic vending device was occupied by each purchaser for a rather long period of time.

This problem can be relatively alleviated by reducing the time of data writing into a recording medium and increasing the communication speed of the data used in the approval procedure. However, there is a limit in shortening the time required particularly in the case where data of a large amount of an electronic copyrighted work such as book data is to be written into a recording medium.

A possible approach to solve this problem is to increase the number of automatic vending devices according to the number of users. However, an automatic vending device dedicated to the sales of a copyrighted work is expensive and the area for installation thereof is also required. It is therefore desirable to correspond to many users with the minimum number of automatic vending devices.

In accordance with the development of the hardware of a terminal device such as a personal computer and the software, the publication of an electronic book which is one type of electronic copyrighted work has become more widespread. One can look up into a dictionary or read a story by means of a terminal device. Therefore, the terminal device must be capable of reproducing the electronic book for display on a display device. However, the display device includes various display attributes. There is the case where the contents of the electronic book cannot be displayed properly. For example, image data includes display attributes such as the resolution, the number of colors, the gradation tone, and the like. When the image data is to be displayed on a display device having another display attribute, the image data must be converted so as to conform to the display attribute of the display device through various methods such as resolution conversion (magnification, reduction), reducing number of colors, dithering process and the like. However, there is the disadvantage of degradation in the picture quality if the same process is applied on the entire region of the former image data.

The invention disclosed in Japanese Patent Laying-Open No. 62-277855 is directed to solve this problem. The image processing apparatus disclosed in this Japanese Patent Laying-Open No. 62-277855 alters the image processing method such as magnification, reduction, gradation tone conversion and the like according to the type of image in each region of the image. However, the operation becomes tedious when the image data is to be processed by the image processing apparatus since the user has to specify the region and select the image process. If these processes are to be automated, the type of image in each region of the image must be identified. However, this processing amount is so great that image processing will become time consuming in a portable terminal device or the like whose processing speed is low.

In the sales of the contents of an electronic book, the illegal copy of the contents of the electronic bibliography must be prevented from the standpoint of protecting the copyright. The invention disclosed in Japanese Patent Laying-Open No. 5-122701 is known as the art related thereto. The charge account information processor disclosed in this Japanese Patent Laying-Open No. 5-122701 includes a magneto-optical disk in which is stored a program or data required to decode the encoded series of information group or a series of information group with partially missing information transmitted through air or a predetermined transmission path, a magneto-optical disk drive device carrying out information recording or reproduction to or from the magneto-optical disk, and a personal computer demodulating the series of information group according to the program or data on the magneto-optical disk. The personal computer reproduces the program or data required to demodulate the series of information group from the magneto-optical disk, and demodulates the series of information group using the reproduced program or data. Accordingly, only certain users can utilize the series of information group transmitted towards a plurality of users.

When the distributor of the series of information group, for example the distributor of software, produces a magneto-optical disk for sales, the charge account of the software can be accommodated by including the usage fee of the software. However, the fee can be charged only on a medium (magneto-optical disk) basis. There was a problem that the royalty fee of each software could not be charged when a plurality of software are stored in a medium.

In view of the foregoing, a first object of the present invention is to provide an electronic copyrighted work sales apparatus that can administer the copyright royalty by an external source.

A second object is to provide an electronic copyrighted work sales apparatus capable of preventing illegal readout or removal of sales information.

A third object is to provide a copyright royalty fee management apparatus capable of administrating the copyright royalty fee for each copyright holder.

A fourth object is to provide an electronic copyrighted work distribution management system that can administer the copyright royalty fee of an electronic copyrighted work sold by an electronic copyrighted work sales apparatus, and prevent illegal sales of an electronic copyrighted work.

The fifth object is to provide an electronic copyrighted work sales apparatus selling contents of an electronic book that can be reproduced only through a particular electronic book display apparatus.

The sixth object is to provide an electronic book display apparatus capable of altering encoded contents that can be reproduced according to charge account status and the like.

The seventh object is to provide a key information management apparatus generating and transmitting as necessary auxiliary information that is required in reproducing the contents.

The eighth object is to provide an electronic copyrighted work distribution management system that allows a user to purchase and display an electronic book that can be reproduced only through a particular electronic book display apparatus.

DISCLOSURE OF THE INVENTION

According to an aspect of the present invention, an electronic copyrighted work sales apparatus includes a manipulation unit to select a desired electronic copyrighted work, a copyright royalty information storage unit storing copyright royalty information of an electronic copyrighted work, a copyrighted work data storage unit storing electronic copyrighted work data, a copyright royalty calculation unit calculating the copyright royalty of an electronic copyrighted work selected by the manipulation unit according to the copyright royalty information stored in the copyright royalty information storage unit, a communication unit transmitting the copyright royalty calculated by the copyright royalty calculation unit to an external source, and a copyrighted work data write unit writing into a recording medium electronic copyrighted work data corresponding to the electronic copyrighted work selected through the manipulation unit from the electronic copyrighted work data stored in the copyrighted work data storage unit.

Since the communication unit transmits the copyright royalty fee calculated by the copyright royalty calculation unit to an external source, the copyright royalty can be administered by an external source.

Preferably, the electronic copyrighted work sales apparatus further includes a sales information recording unit storing the sales status of the electronic copyrighted work sales apparatus.

By the inclusion of a sales information recording unit recording the sales status in the electronic copyrighted work sales apparatus, the sales status of the electronic copyrighted work sales apparatus can be identified by reading out the information recorded in the sales information recording unit.

Preferably, the electronic copyrighted work sales apparatus further includes an identification information storage unit storing identification information of an electronic copyrighted work sales apparatus, and a sales information control unit sensing attachment of a sales information readout card corresponding to the identification information stored in the identification information storage unit to read out the sales status recorded in the sales information recording unit.

Since the sales information control unit senses attachment of a sales information readout card corresponding to the identification information stored in the identification information storage unit to read out the sales status recorded in the sales information recording unit, illegal readout of the information recorded in the sales information recording unit can be prevented.

Preferably, the sales information control unit reads out and executes a portion of the program corresponding to the identification information stored in the identification information storage unit and the remaining portion of the program stored in the sales information readout card to read out the sales status recorded in the sales information recording unit.

Since the sales information control unit reads out and executes a portion of the program corresponding to the identification information stored in the identification information storage unit and the remaining portion of the program recorded in the sales information readout card, illegal readout of the information recorded in the sales information recording unit can be prevented more effectively.

Preferably, the electronic copyrighted work sales apparatus further includes an identification information storage unit storing identification information of an electronic copyrighted work sales apparatus, and a sales information control unit sensing attachment of a sales information management card corresponding to the identification information stored in the identification information storage unit to read out and then delete the information status recorded in the sales information recording unit.

Since the sales information control unit senses attachment of a sales information management card corresponding to the identification information stored in the identification information storage unit to read out and then delete the sales status recorded in the sales information recording unit, the information recorded in the sales information recording unit can be prevented from being deleted illegally.

Preferably, the sales information control unit reads out and executes a portion of the program corresponding to the identification information stored in the identification information storage unit and the remaining portion of the program stored in the sales information management card to read out and then delete the sales information recorded in the sales information recording unit.

Since the sales information control unit reads out and executes a portion of the program corresponding to the identification information stored in the identification information storage unit and the remaining portion of the program stored in the sales information readout card, illegal delete of the information recorded in the sales information recording unit can be prevented further effectively.

Preferably, the electronic copyrighted work sales apparatus further includes a recording medium storage unit storing a plurality of recording media. The copyrighted work data write unit writes the electronic copyrighted work data sequentially into a plurality of recording media stored in the recording medium storage unit.

Since the copyrighted work data write unit writes electronic copyrighted work data sequentially into the plurality of recording media stored in the recording media storage unit, the purchase procedure by a purchaser can be carried out concurrently even when electronic copyrighted work data is written into the recording medium.

According to another aspect of the present invention, a copyright management apparatus includes a communication unit receiving from an external source copyright royalty data of an electronic copyrighted work sold, a copyright information storage unit storing copyright information of an electronic copyrighted work to be sold, and a copyright royalty data storage unit storing for each copyright holder copyright royalty data received by the communication unit according to the copyright information stored in the copyright information storage unit.

Since the copyright royalty data storage unit stores for each copyright holder the copyright royalty data received by the communication unit according to the copyright information stored in the copyright information storage unit, the copyright royalty can be administered.

Preferably, the copyright management apparatus further includes a copyright royalty data approval processing unit causing the communication unit to transmit to an external source the copyright royalty data stored in the copyright royalty data storage unit when approval is made of the copyright royalty data stored in the copyright royalty data recording unit.

Since the copyright royalty data approval processing unit causes the communication unit to transmits to an external source the copyright royalty data recorded in the copyright royalty data recording when approval is made of the copyright royalty data recorded in the copyright royalty data recording unit, transmission of copyright royalty data not approved by the copyright holder to an external source can be prevented.

According to a further aspect of the present invention, an electronic copyrighted work distribution management system includes an electronic copyrighted work sales apparatus selling an electronic copyrighted work, a copyright management apparatus administering the copyright royalty fee of an electronic copyrighted work sold by the electronic copyrighted work sales apparatus, a seller terminal used by a seller, and a copyright holder terminal used by the copyright holder. The electronic copyrighted work sales apparatus includes a manipulation unit to select a desired electronic copyrighted work, a copyright royalty information storage unit storing copyright royalty information of an electronic copyrighted work, a copyrighted work data storage unit storing electronic copyrighted work data, a copyright royalty calculation unit calculating the copyright royalty of an electronic copyrighted work selected through the manipulation unit according to the copyright royalty information stored in the copyright royalty information storage unit, a first communication unit transmitting the copyright royalty calculated by the copyright royalty calculation unit to the copyright management apparatus, and a copyrighted work data write unit writing into a recording medium electronic copyrighted work data corresponding to an electronic copyrighted work selected through the manipulation unit out from the electronic copyrighted work data stored in the copyrighted work data storage unit. The copyright management apparatus includes a second communication unit receiving from a copyrighted work sales apparatus copyright royalty data of an electronic copyrighted work sold, a copyright information storage unit storing copyright information of an electronic copyrighted work to be sold, a copyright royalty data storage unit storing for each copyright holder copyright royalty data received by the second communication unit according to the copyright information stored in the copyright information storage unit, and a copyright royalty data approval processing unit transmitting to a seller terminal copyright royalty data recorded in the copyright royalty data recording unit with respect to the second communication unit when there is approval of the copyright royalty data recorded in the copyright royalty data recording unit from the copyright holder terminal.

Since the copyright management apparatus receives the copyright royalty data transmitted from the electronic copyrighted work sales apparatus to store the copyright royalty data for each copyright holder, the copyright royalty can be administered. Also, since the copyright management apparatus transmits the copyright royalty data to the seller terminal when there is approval of the copyright royalty data from the copyright holder terminal, transmission of copyright royalty data not approved by the copyright holder to the seller terminal can be prevented.

According to still another aspect of the present invention, an electronic copyrighted work sales apparatus includes a communication unit carrying out data communication with an external source, a user interface for a user to select desired contents, a storage unit storing in correspondence the contents of an electronic book and a contents identifier, a communication port to which a user identifier is input, and a processing unit extracting from the storage unit a contents identifier corresponding to the contents selected by the user interface, transmitting through the communication unit the contents identifier and the user identifier input to the input port, and providing in a pair auxiliary information to display the contents received through the communication unit and the contents of an electronic book selected by the user interface.

Since the processing unit outputs the auxiliary information received by the communication unit and the contents of the electronic book selected by the user interface in a pair, contents that can be reproduced only by a particular user can be provided.

Preferably, the electronic copyrighted work sales apparatus further includes a charge account processing unit carrying out charge account from a user. The processing unit alters the contents identifier to be transmitted by the communication unit according to the charge account status by the charge account processing unit.

Since the processing unit alters the contents identifier transmitted by the communication unit according to the charge account status by the charge account processing unit, the contents that can be reproduced can be altered by the charge account status.

According to a still further aspect of the present invention, a key information management apparatus includes a communication unit carrying out data communication with an external source, a first table storing a contents identifier corresponding to the contents of an electronic book and a contents key in correspondence, a second table storing a user identifier and a user key in correspondence, and a processing unit referring to the first and second tables to extract a contents key and a user key according to the contents identifier and the user identifier received by the communication unit to generate and transmit to the communication unit auxiliary information to display the contents from the extracted contents key and user key.

Since the processing unit generates and transmits to the communication unit the auxiliary information to display the contents from the extracted contents key and user key, the auxiliary information can be provided so that only a particular user can utilize the contents key.

According to yet a further aspect of the present invention, an electronic book display apparatus includes an input unit to enter auxiliary information to display the contents and encoded contents of an electronic book, a processing unit generating a contents key from the auxiliary information entered through the input unit and a prestored user key, and reproducing the encoded contents entered by the input unit using the contents key, and a display unit displaying the contents reproduced by the processing unit.

Since the processing unit generates a contents key from the auxiliary information entered through the input unit and a prestored user key, and reproduces the encoded contents entered through the input unit using the contents key, only a particular electronic book display apparatus can reproduce that encoded contents.

Preferably, the encoded contents include a plurality of modules including at least one of data and a processing program. The processing unit sequentially executes the plurality of modules to reproduce the contents of an electronic book.

Since the encoded contents include a plurality of modules including at least the data or the processing program, the contents of an electronic book can be reproduced by appropriately executing the module by the processing unit.

Preferably, the plurality of modules include a module with the description of display attribute information. The processing unit extracts a display attribute from the module with the description of a display attribute to selectively execute a plurality of modules according to the display attribute.

Since the processing unit selectively executes a plurality of modules according to the display attribute, only image data matching the display attribute can be reproduced.

Preferably, the plurality of modules include a module with the description of information indicating the type of contents key. The processing unit extracts information indicating the type of contents key from the module with the description of the information indicating the type of contents key to determine whether to execute the relevant module according to the information.

Since the processing unit determines whether to execute a module according to the information indicating the type of contents key, the encoded contents that can be reproduced can be altered according to the charge account status.

Preferably, the electronic book display apparatus further includes a recording medium having auxiliary information to display contents and encoded contents of an electronic book recorded. The input unit reads out the auxiliary information and the encoded contents of the electronic book, recorded in the recording medium.

Since the input unit reads out the auxiliary information and the encoded contents of the electronic book recorded in the recording medium, the contents of an electronic book can be provided to a user through the recording medium.

Preferably, the recording medium has the auxiliary information recorded in a nonreadable region.

Since the auxiliary information is recorded in a nonreadable region of a recording medium, readout of this auxiliary information by a general purpose reader apparatus can be prevented.

According to yet another aspect of the present invention, an electronic copyrighted work distribution management system includes an electronic copyrighted work sales apparatus selling an electronic book, a key information management apparatus administering the key information of an electronic book to be sold by the electronic copyrighted work sales apparatus, and an electronic book display apparatus reproducing and displaying an electronic book sold by the electronic copyrighted work sales apparatus. The electronic copyrighted work sales apparatus includes a first communication unit carrying out data communication with the key information management apparatus, a user interface for a user to select desired contents, a storage unit storing contents of an electronic book and a contents identifier in correspondence, a communication port to which a user identifier is input, and a first processing unit extracting from the storage unit a contents identifier corresponding to the contents selected by the user interface, causing the first communication unit to transmit the contents identifier and the user identifier input through the communication port, and providing in a pair auxiliary information to display the contents received by the first communication unit and the contents of an electronic book selected by the user interface. The key information management apparatus includes a second communication unit carrying out data communication with the electronic copyrighted work sales apparatus, a first table storing a contents identifier corresponding to the contents of an electronic book and a contents key in correspondence, a second table storing a user identifier and a user key in correspondence, and a second processing unit referring to the first table (501) and the second table to extract a contents key and a user key according to the contents identifier and user identifier received by the second communication unit to generate and transmit to the second communication unit auxiliary information to display the contents from the extracted contents key and user key. The electronic book display apparatus includes an input unit entering auxiliary information to display the contents and encoded contents of an electronic book, a third processing unit generating a contents key from the auxiliary information entered through the input unit and a prestored user key to reproduce encoded contents entered through the input unit using the contents key, and a display unit displaying the contents reproduced by the third processing unit.

Since the electronic book display apparatus can input the auxiliary information and encoded contents output from electronic copyrighted work sales apparatus, generate a contents key from the auxiliary information and a prestored user key, and reproduce the encoded contents using the contents key, the encoded contents can be reproduced only by a particular electronic book display apparatus.

According to yet another aspect of the present invention, an electronic copyrighted work sales apparatus includes a processing unit generating and adding to electronic book data auxiliary information according to electronic book data and the input user identifier.

Since the processing unit generates and adds to the electronic book data auxiliary information according to the electronic book data and input user identifier, contents reproducible by only a particular user can be provided.

Preferably, the processing unit includes a first processing unit calculating and adding to electronic book data a usage time limit according to information defined at the header of electronic book data, a second processing unit encrypting and adding to the electronic book data the contents of an electronic book data, and a third processing unit calculating a hash value from the header added by the first processing unit and the contents added by the second processing unit using a hash function to encrypt the hash value with the user identifier and add the same to the electronic book data as auxiliary information.

Since the third processing unit calculates a hash value from the header added by the first processing unit and the contents added by the second processing unit using a hash function to encrypt the hash value with the user identifier to add the same to electronic book data as auxiliary information, display of contents copied illegally through the electronic book display apparatus can be prevented.

According to yet a still further aspect of the present invention, an electronic book display apparatus includes a first processing unit generating auxiliary information according to electronic book data and a user identifier to compare the generated auxiliary information with the auxiliary information added to the electronic book data, and a reproduction processing unit determining the reproduction processing method of the contents according to the comparison result by the first processing unit to reproduce the contents.

Since the reproduction processing unit determines the reproduction processing method of the contents according to the comparison result by the first processing unit to reproduce the contents, only a particular user can reproduce and display the contents.

Preferably, the electronic book display apparatus further includes a second processing unit comparing information of the usage time limit defined at the header of the electronic book data with the current time to determine and command the reproduction processing unit whether to display the contents or not.

Since the second processing unit compares the usage time limit information defined at the header of the electronic book data with the current time to determine and command the reproduction processing unit whether to display the contents or not, expire by the time limit from when the contents have been purchased is allowed.

Preferably, the electronic book display apparatus further includes a third processing unit determining whether to decode with the user identifier the encoded contents of an electronic book data according to the comparison result by the first processing unit.

Since the third processing unit determines whether to decode with the user identifier the encrypted contents of the electronic book data according to the comparison result by the first processing unit and executes the process, reproduction and display of contents illegally copied can be prevented.

Preferably, the electronic book display apparatus further includes a user identifier registration unit registering a user identifier automatically generated or input by a user.

Since the user identifier registration unit registers a user identifier that has been automatically generated or input by a user, the publisher, the key management sensor, or the like does not have to administer the user identifier. Therefore, the procedure can be simplified.

BRIEF DESCRIPTION OF THE DRAWINGS

FIG. 2 is a flow chart to describe the processing procedure of the electronic copyrighted work distribution management system of the first embodiment of the present invention.

FIGS. 3A–3C are diagrams to describe the data structure of an electronic book.

FIG. 4 shows a schematic structure of an electronic copyrighted work distribution management system according to a second embodiment of the present invention.

FIG. 17 shows an example (first example) of encoded contents.

FIG. 18 shows an example (second example) of encoded contents.

FIG. 19 shows an example of a processing table.

BEST MODES FOR CARRYING OUT THE INVENTION

First Embodiment

Figure 1:
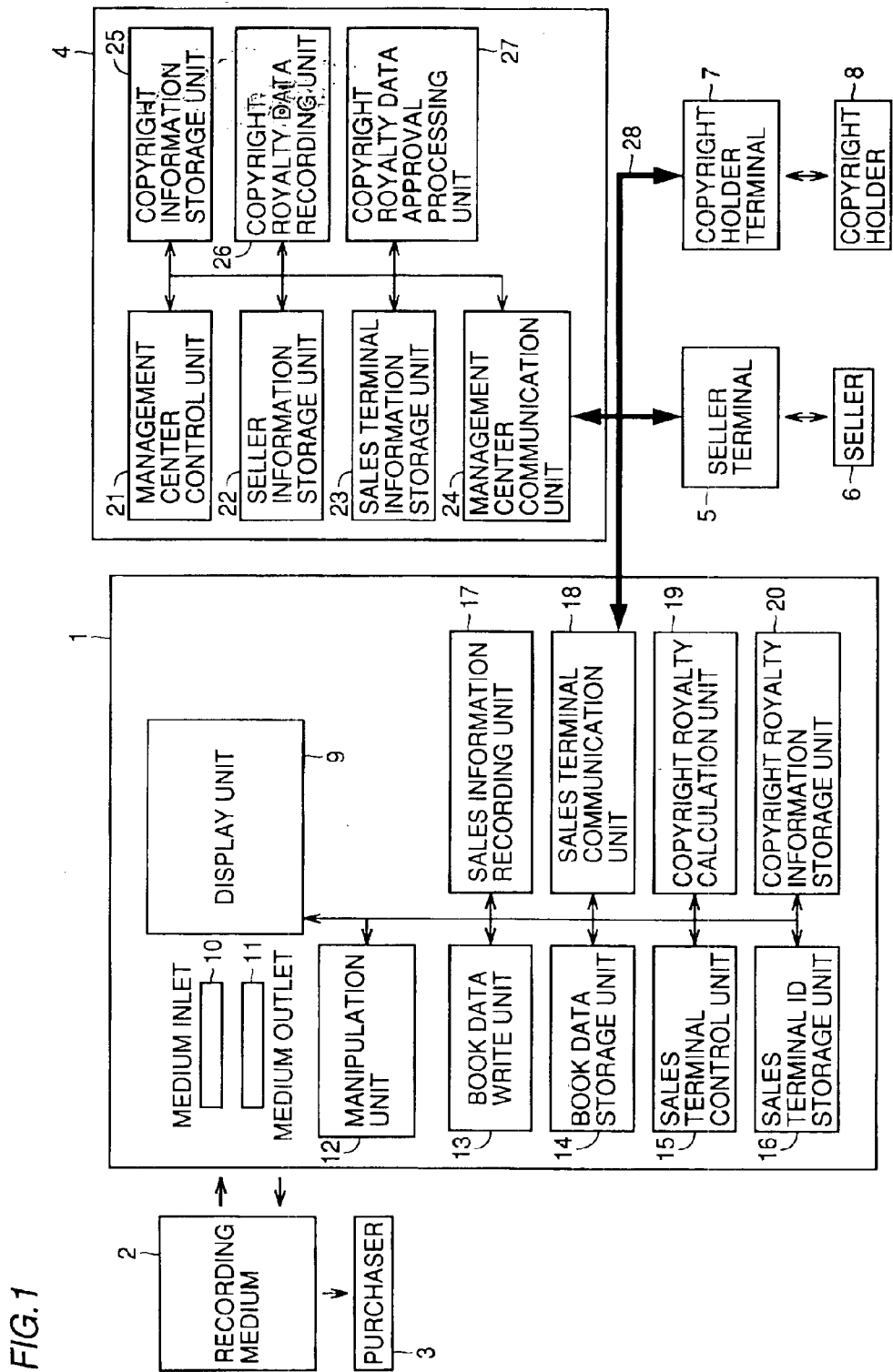
FIG. 1 shows a schematic structure of an electronic copyrighted work distribution management system according to a first embodiment of the present invention.

Referring to FIG. 1, an electronic copyrighted work sales system according to a first embodiment of the present invention includes an electronic book sales apparatus (referring to as "sales terminal" hereinafter) for a purchaser 3 to carry out purchasing procedures of an electronic copyrighted work, and write the electronic book data to be purchased into a recording medium 2, a copyright management apparatus (referring to as "copyright management center" hereinafter) 4 administering the copyright royalty fee with respect to the electronic book data sold by sales terminal 1, a seller terminal 5 used by a seller 6 of an electronic book, and a copyright holder terminal 7 used by a copyright holder 8 of the electronic book. Sales terminal 1, copyright management center 4, sales terminal 5 and copyright holder terminal 7 are respectively connected via a communication line 28.

Sales terminal 1 includes a display unit 9 displaying book information that is required for purchaser 3 to select an electronic book to be purchased, the manipulation method of sales terminal 1, and the like, a manipulation unit 12 through which the procedure to purchase an electronic book is carried out, a book data write unit 13 writing selected electronic book data into recording medium 2 inserted via a medium inlet 10, a book data storage unit 14 in which is recorded electronic book data corresponding to a plurality of books, a sales terminal control unit 15 providing the entire control of sales terminal 1, a sales terminal ID storage unit 16 storing the ID number of sales terminal 1 for administration added to each sales terminal 1 installed at various sites, a sales information recording unit 17 recording information related to sales status of an electronic book at sales terminal 1, a copyright royalty information storage unit 20 storing information related to a copyright royalty of an electronic book to be sold, a copyright royalty calculation unit 19 calculating a copyright royalty of an electronic book to be sold according to the information stored in copyright royalty information storage unit 20, and a sales terminal communication unit 18 carrying out transmission/reception of information via a communication line 28 such as a telephone line. Sales terminal communication unit 18 may transmit/receive information by radio instead of by wire.

Purchaser 3 inserts recording medium 2 through medium inlet 10 and manipulates manipulation unit 12 according to the contents displayed on display unit 9, whereby electronic book data of a desired book is written into recording medium 2. Recording medium 2 into which electronic book data is written is output through a medium outlet 11. Although a medium inlet 10 and a medium outlet 11 are provided separately, a structure with a common slot may be used.

Book data storage unit 14, sales terminal ID storage unit 16, sales information storage unit 17 and copyright royalty information storage unit 20 are formed of an electrically readable and writable nonvolatile memory that can retain information independent of whether there is a main power supply or not, a memory with the backup of a battery, a recording medium recorded magnetically, or the like.

Sales terminal control unit 15 is formed of a CPU (central processing unit), a ROM (read only memory) in which an execution program of the CPU is recorded, and a RAM (random access memory) used as the work area, and the like. Control of sales terminal 1 is provided by the CPU executing the program stored in the ROM or RAM.

Copyright royalty calculation unit 19 extracts copyright royalty information corresponding to the electronic book selected by the purchaser from the copyright information stored in copyright royalty information storage unit 20 to calculate the copyright royalty fee thereof. The CPU in sales terminal control unit 15 may carry out this calculation of the copyright royalty.

Copyright management center 4 includes a management center control unit 21 providing the entire control of copyright management center 4, a seller information storage unit 22 administering information related to the seller of an electronic book to be sold by seller terminal 1, a sales terminal information storage unit 23 administering the sales terminal ID of each sales terminal installed at various sites and information related to the sales terminal corresponding to each sales terminal ID, a management center communication unit 24 carrying out data transmission/reception via a communication line such as a telephone line, a copyright information storage unit 25 storing information related to the copyright of an electronic book to be sold by sales terminal 1, a copyright royalty data recording unit 26 storing copyright royalty data related to an electronic book sold by sales terminal 1, and a copyright royalty data approval processing unit 27 collecting copyright royalty information according to the approval procedure carried out by copyright holder 8 via copyright holder terminal 7 to generate information to be transmitted to seller terminal 5. Management center communication unit 24 may transmit/receive information by radio instead of by wire.

Sales terminal 5 is a communication terminal capable of data communication between sales terminal 1 and copyright management center 4. Copyright holder terminal 7 is a communication terminal capable of data communication with copyright management center 4. Seller terminal and copyright holder terminal 7 can be realized by a device such as a personal computer that can carry out data communication through a communication line. The information related to seller terminal 5 and copyright holder terminal 7 is administered by copyright management center 4. The seller or the copyright holder can obtain the required information from copyright management center 4 through seller terminal 5 or copyright holder terminal 7.

FIG. 1 shows a structure in which seller terminal 5 and copyright holder terminal 7 are individual terminals. In the case where seller 6 owns the copyright of an electronic copyrighted work of a copyright holder 8, seller terminal 5 and copyright holder terminal 7 may be configured of the same terminal. In this case, seller terminal 5 and copyright holder terminal 7 are registered in copyright management center 4 as the same terminal.

FIG. 1 shows a structure in which one seller 6 uses one seller terminal 5. However, a plurality of sellers 6 can administer the electronic copyrighted work using one seller terminal 5.

The processing procedure of the electronic copyrighted work distribution management system of the present embodiment for purchaser 3 to purchase an electronic book will be described with reference to FIG. 2. First, purchaser 3 selects an electronic book to be purchased using manipulation unit 12 according to the displayed contents of display unit 9 of seller terminal 1 (S1). Then, purchaser 3 inserts recording medium 2 into which the electronic book is to be recorded (S2).

Upon insertion of recording medium 2 through medium inlet 10, sales terminal control unit 15 causes copyright royalty calculation unit 19 to calculate the copyright royalty fee. Copyright royalty calculation unit 19 refers to the copyright royalty information stored in copyright royalty information storage unit 20 to calculate the copyright royalty fee of the electronic book selected by purchaser 3 (S3).

Sales terminal control unit 15 records in sales information recording unit 17 information indicating the start of transmission of the copyright royalty data calculated by copyright royalty calculation unit 19 from seller terminal 1 to copyright management center 4 (S4). Sales terminal control unit 15 causes the copyright royalty data to be transmitted by sales terminal communication unit 18 to copyright management center 4 via communication line 28 (S5).

Management center control unit 21 of copyright management center 4 receives the copyright royalty data via communication line 28 and management center communication unit 24. That copyright royalty data is recorded in a copyright royalty data recording unit 26 that administers and records the copyright royalty fee for each copyright holder (S6). Management center control unit 24 notifies sales terminal 1 via management center communication unit 24 and communication line 28 that registration of the copyright royalty has ended (S7).

Upon receiving the information that registration of the copyright royalty has ended via communication line 28 and sales terminal communication unit 18, sales terminal control unit 15 records in sales information recording unit 17 information indicating that the royalty fee data has been registered in copyright management center 4 (S8). Then, sales terminal control unit 15 records in sales information recording unit 17 information indicating initiation of writing electronic book data selected by purchaser 3 into recording medium 2 (S9). The writing operation of the electronic book data into recording medium 2 is initiated by book data write unit 13 (S10).

Sales terminal control unit 15 confirms that the writing operation of the electronic book data selected by purchaser 3 into recording medium 2 has ended, and records into sales information recording unit 17 information indicating write completion when the writing operation has ended properly. If the writing operation did not end properly, sales terminal control unit 15 records write error information into sales information recording unit 17 (S11). Upon confirmation of the proper completion of writing of the electronic book data by sales terminal control unit 15, recording medium 2 is discharged from medium outlet 11 (S12).

By the foregoing processing procedure, check can be made based on the information recorded in sales information recording unit 17 of sales terminal 1 when an error occurs during transmission of copyright royalty data at sales terminal 1 towards copyright management center 4 and there is difference between the data recorded in copyright royalty data recording unit 26 of copyright management center 4 and the actual sales history.

Even in the abnormal case where the operation of sales terminal 1 stops by electric power failure or the like during the writing operation of the electronic book data into recording medium 2 of purchaser 3 by sales terminal 1, the status of only initiating the writing operation is recorded in sales information recording unit 17. Therefore, confirmation can be made that the sales of the electronic book data did not end properly.

In the case where the copyright of a plurality of copyright holders is included in one electronic book to be sold, copyright royalty calculation unit 19 can calculate the copyright royalty fee for each copyright holder according to the information stored in copyright royalty information storage unit 20. Copyright management center 4 receives through communication line 28 and management center communication unit 24 the copyright royalty with respect to each copyright holder, and records into copyright royalty data recording unit 26 the copyright royalty corresponding to each copyright holder according to the copyright information stored in copyright information storage unit 25.

Copyright holder 8 can refer to his/her own copyright royalty data recorded in copyright royalty data recording unit 26 of copyright management center 4 through copyright holder terminal 7 to approve that copyright royalty data. When there is approval from copyright holder 8, copyright royalty data approval processing unit 27 transmits that copyright royalty data to seller terminal 5 via management center communication unit 24.

FIG. 3A shows the data structure of a book written by one copyright holder. The structure of electronic book data corresponding to one book is depicted. The data structure includes "book 1-ID" indicating the ID of a book 1, "bibliography information 1" indicating bibliography information associated with a book such as the title of the book, the price, the name of the writer or publisher, and the like, "copyright holder A-ID" indicating information related to a copyright holder A who is the copyright owner of book 1, "copyright royalty information A1" indicating the copyright royalty information related to book 1 of copyright holder A, and "book data A1" corresponding to the body text of book 1.

In registering the electronic book data of book 1 into sales terminal 1, "book 1-ID", "bibliography information 1" and "book data A1" are registered in book data storage unit 14 whereas "copyright royalty information A1" is registered in copyright royalty information storage unit 20 so as to correspond to "copyright holder A-ID".

FIG. 3B shows the data structure of a book written by a plurality of writers. The structure of the electronic book data corresponding to one book is shown. This data structure includes "book 2-ID" indicating the ID of a book 2, "bibliography information 2" indicating the bibliography information of book 2, "copyright holder A-ID" indicating the ID of copyright holder A, "copyright royalty information A2" indicating the copyright royalty for copyright holder A, "bibliography data A2" corresponding to the body text written by copyright holder A, "copyright holder B-ID" indicating the ID of an copyright holder B, "copyright royalty information B2" indicating the copyright royalty for copyright holder B, and "book data B2" corresponding to the body text written by copyright holder B. In the case where there are more copyright holders, the data thereof is stored subsequent to "book data B2".

In registering the electronic book data of book 2 into sales terminal 1, "book 2-ID", "bibliography information 2", "book data A2" and "book data B2" are registered in book data storage unit 14 whereas "copyright royalty information A2" and "copyright royalty information B2" are registered in copyright royalty information storage unit 20 so as to correspond to "copyright holder A-ID" and "copyright holder B-ID", respectively.

FIG. 3C shows a data structure in which the electronic book data corresponding to one book is divided per chapter or section. This data structure includes "book 3-ID" indicating the ID of a book 3, "bibliography information 3" indicating the bibliography information of book 3, "copyright holder A-ID" indicating the ID of copyright holder A, "copyright royalty information A3$a$" indicating the copyright royalty for book data A3$a$, "book data A3$a$" corresponding to the first chapter or section of the body text, "copyright holder A-ID" indicating the ID of copyright holder A, "copyright royalty information A3$b$" indicating the copyright royalty for book data A3$b$, and "book data A3$b$" corresponding to the next chapter or section of the body text. In the case where there are other chapters or sections, the relevant data is stored subsequent to "book data A3$b$".

In registering the electronic book data of book 2 into sales terminal 1, "book 3-ID", "bibliography information 3", "book data A3$a$" and "book data A3$b$" are registered in book data storage unit 14 whereas "copyright royalty information A3$a$" and "copyright royalty information A3$b$" are registered in copyright royalty information storage unit 2 so as to correspond to "copyright holder A-ID".

In the electronic copyrighted work distribution management system of the present embodiment, an inlet to insert money into sales terminal 1 or an inlet to insert a cashless card such as a credit card, a prepaid card, or the like may be provided for the charge account of an electronic book sold. Also, charge accounting can be settled through electronic financial transaction through sales terminal communication unit 18 and communication line 28.

In the case where an inlet is provided for the charge account at sales terminal 1, sales terminal 1 is installed at the store of bookshops, station stalls and the like as a dedicated terminal to have the payment of the charge account corresponding to the sales collected. In the case where an inlet for the charge account is not provided at sales terminal 1, sales terminal 1 can be realized by a general purpose device such as a personal computer. A recording device such as a hard disk of a personal computer is employed as sales terminal ID storage unit 16 to have sales terminal ID information pre-stored at that recording device. When purchaser 3 purchases an electronic book, information related to the sales terminal ID is input through manipulation unit 12, whereby determination is made of the approval of purchase by comparing with the sales terminal ID recorded in the recording device.

In this case, information related to the individual who owns the personal computer is registered as the sales terminal ID. It is noted that the anonymity of purchaser 3 is not necessary lost since copyright management center 4 does not actually use that sales terminal and directly administers the information related to the purchaser that is to obtain the electronic copyrighted work such as an electronic book.

Communication line 28 connecting sales terminal 1, copyright management center 4, seller terminal 5 and copyright holder terminal 7 may be an exclusive line other than the public line. Alternatively, data communication can be carried out through radio such as a satellite. The electronic copyrighted work distribution management system of the present embodiment sells book data converted into electronic form as an electronic copyrighted work. However, an electronic copyrighted work such as data corresponding to music converted into electronic form, a program for a personal computer, software dedicated to a game, or the like may be distributed by the electronic copyrighted work distribution management system.

By storing an electronic copyrighted work other than an electronic book in book data storage unit 14 of sales terminal 1, and having book data write unit 14 write that electronic copyrighted work data into recording medium 2 of purchaser 3, electronic copyrighted work other than an electronic book can be sold.

According to the electronic copyrighted work distribution management system of the present embodiment described above, the copyright royalty is calculated when the electronic copyrighted work is sold at sales terminal 1, and the copyright royalty data is registered at copyright management center 4 when the electronic copyrighted work data is recorded into recording medium 2 of purchaser 3. Therefore, the copyright royalty can be accumulated properly without the sales information being administered together. The problem of the proper copyright royalty fees not being paid to the copyright holder due to falsified sold amount can be eliminated.

By obtaining approval from copyright management center 4 in selling an electronic copyrighted work by sales terminal 1, the sales of an illegal electronic copyrighted work whose copyright data is not set at sales terminal 1 can be detected since mismatch occurs between the information recorded in sales information recording unit 17 and the approval history at copyright management center 4.

In the case where an erroneous state occurs caused by power failure or the like during the sales by sales terminal 1, the current sales status can be identified by the information recorded in sales information recording unit 17. This reduces the possibility of trouble with purchaser 3 or with the copyright holder.

Second Embodiment

FIG. 4 is a block diagram showing a schematic structure of an electronic copyrighted work distribution management system according to a second embodiment of the present invention. Since recording medium 2, copyright management center 4, seller terminal 5 and copyright holder terminal 7 in the electronic copyrighted work distribution management system of the second embodiment are identical to those of the electronic copyrighted work distribution management system of the first embodiment shown in FIG. 1, detailed description thereof will not be repeated.

A sales terminal 29 of the second embodiment differs from sales terminal 1 of FIG. 1 in the addition of a sales information recording unit 30 recording information related to the sales status of an electronic book at sales terminal 29, a sales information control unit 31 providing control of the write, read, and editing operations such as delete of the sales information recorded in sales information recording unit 30, a sales information management unit 32 administering the editing process of the sales information by sales information control unit 31, and a sales information management card connection unit 33 to which a sales information readout card 34 or a sales information management card 35 is connected in reading out or deleting the sales information recorded in sales information recording unit 30. Detailed description of the remaining structure and function will not be repeated.

Sales information recording unit 30 is recorded with information related to the communication progress with copyright management center 4 in selling an electronic book described in the previous first embodiment and the information of the progress in writing book data into recording medium 2. In a normal sales mode, sales information control unit 31 records these information into sales information recording unit 30 without any particular restriction.

Upon connection of a sales information readout card 34 to sales information management card connection unit 33, the information recorded in sales information recording unit 30 begins to be read out in response to a predetermined operation through manipulation unit 12. Upon confirmation of connection of sales information readout card 34 to sales information management card connection unit 33, sales information control unit 31 reads out the required information from the sales information recorded in sales information recording unit 30. The readout information is displayed at display unit 9, written into recording medium 2 inserted through medium inlet 10, or printed out at a printer not shown connected to sales terminal 29. Thus, the operator can obtain the information recorded in sales information recording unit 30.

A portion of the program (program to read out the sales information recorded in sales information recording unit 30) corresponding to the sales terminal ID stored in sales terminal ID storage unit 16 is recorded in sales terminal 29. The remaining portion of the program corresponding to the sales terminal ID recorded in sales terminal ID recording unit 16 is stored in sales information readout card 34. Sales information readout card 34 cannot be used at another sales terminal since it corresponds to this sales terminal ID. Thus, sales information management unit 32 has the program corresponding to the sales terminal ID executed to allow readout of information from sales information recording unit 30 only when a sales information readout card 34 corresponding to the sales terminal ID is connected to sales information management card connection unit 33.

Also, sales information control unit 31 may control sales information management unit 32 such that information from sales information recording unit 30 is read out only when a predetermined operation, for example a predetermined operation including the input of a password, is carried out by the user through manipulation unit 12. More specifically, control is provided on a hardware basis so that sales information control unit 31 can read out information from sales information recording unit 30 only when the proper password is input, and sales information control unit 31 reads out the program from sales information readout card 34 through sales information management card connection unit 33 and sales information management unit 32.

As described in the first embodiment, sales information is recorded in sales information recording unit 30 when an electronic book is sold by sales terminal 29. When sales information management card 35 is connected to sales information management card connection unit 33, erasure of the information recorded in sales information recording unit 30 is initiated by a predetermined operation through manipulation unit 12. Upon confirming that sales information management card 35 is connected to sales information management card connection unit 33, sales information control unit 31 reads out the sales information recorded in sales information recording unit 30 to write that information into management card storage unit 36 incorporated in sales information management card 35. Then, sales information control unit 31 erases the sales information recorded in sales information recording unit 30.

A portion of the program (program to erase sales information recorded in sales information recording unit 30) corresponding to the sales terminal ID stored in sales terminal ID storage unit 16 is recorded in sales terminal 29. The remaining portion of the program corresponding to the sales terminal ID recorded in sales terminal ID recording unit 16 is recorded in sales information management card 35. Sales information management card 35 cannot be used at another sales terminal since it corresponds to that sales terminal ID. Thus, the program corresponding to the sales terminal ID is executed to erase information recorded in sales information recording unit 30 by sales information control unit 31 only when sales information management card 35 corresponding to the sales terminal ID is connected to sales information management card connection unit 33.

According to the electronic copyrighted work distribution management system of the present invention described above, readout or erasure of the sales information recorded in sales information recording unit 30 is carried out only when a sales information readout card 34 or a sales information management card 35 is connected to sales information management card connection unit 33 of sales terminal 29. Therefore, illegal readout, rewrite, or erasure of the information recorded in sales information recording unit 30 can be prevented.

Since the information recorded in sales information recording unit 30 is recorded in management card storage unit 36 of sales information management card 35, the sales information can be administered together. Since the accumulation administration of the sales information is carried out individually at the sales terminal in the present embodiment in contrast to the centralized administration of the sales information by data communication using a general line, the possibility of the sales information being accessed illegally or leaking is extremely low. Falsifying the sales information at the sales terminal can be prevented.

Third Embodiment

Figure 5:
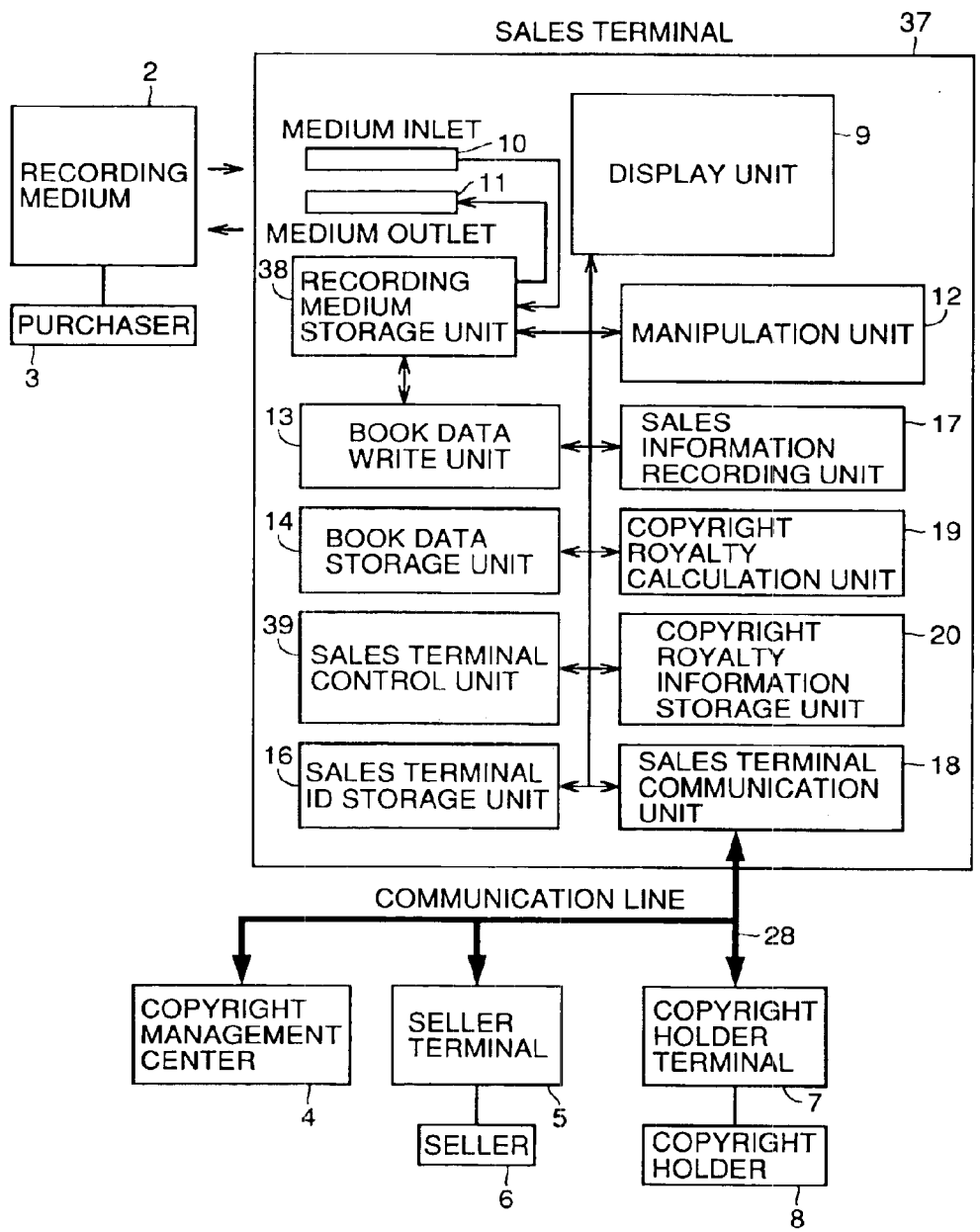
FIG. 5 shows a schematic structure of an electronic copyrighted work distribution management system according to a third embodiment of the present invention.

FIG. 5 is a block diagram showing a schematic structure of an electronic copyrighted work distribution management system according to a third embodiment of the present invention. Since recording medium 2, copyright management center 4, seller terminal 5 and copyright holder terminal 7 in the present electronic copyrighted work distribution management system are identical to those of the electronic copyrighted work distribution management system in the first embodiment of FIG. 1, detailed description thereof will not be repeated.

A sales terminal 37 of the present embodiment differs from sales terminal 1 of FIG. 1 in the addition of a recording media storage unit 38 in which recording medium 2 inserted through medium inlet 10 is temporarily stored, and also in the function of the sales terminal control unit. Therefore, detailed description of duplicating structure and function will not be repeated. The sales terminal control unit is described with the reference number of 39.

Recording medium 2 inserted through medium inlet 10 is temporarily stored in recording medium storage unit 38. When a plurality of recording medium 2 are stored in recording medium storage unit 38, book data is sequentially written into the plurality of recording media 2 upon designation from purchaser 3 by book data write unit 13.

For example, in the case where a plurality of purchasers are to have book data written into respective recording medium 2, the first purchaser 3 inserts a recording medium 2 through medium inlet 10 to carry out the procedure of selecting and purchasing electronic book data. When this procedure of purchasing ends, information indicating how to output recording medium 2 is displayed at display unit 9 or output through a printer not shown connected to sales terminal 37. Then, the writing operation of the electronic book data into recording medium 2 is initiated.

When the next purchaser inserts a recording medium 2 through medium inlet 10, that recording medium 2 is temporarily stored in recording medium storage unit 38. When an electronic book data is selected by that purchaser, waiting is conducted to write the electronic book data into recording medium 2 of the second purchaser until the writing operation of the electronic book data into recording medium 2 of the first purchaser 3 ends. When the writing of the electronic book data into recording medium 2 of the first purchaser 3 ends, completion of writing into recording medium 2 of the first purchaser 3 is notified by displaying or the like at display unit 9. Then the writing of the electronic book data into the recording medium of the next purchaser is initiated. The first purchaser takes out recording medium 2 that has the writing operation completed according to the foregoing information.

In notifying completion of writing to purchaser 3, notification can be made through a communication device owned by that purchaser, for example, a personal computer connected to a communication line.

According to the electronic copyrighted work distribution management system of the present embodiment, a purchaser can carry out the procedure of purchasing concurrently even if book data write unit 13 of sales terminal 37 is currently writing electronic book data into a recording medium 2 of another purchaser. Therefore, the procedure of purchasing by a purchaser can be carried out efficiently.

Fourth Embodiment

Figure 6:
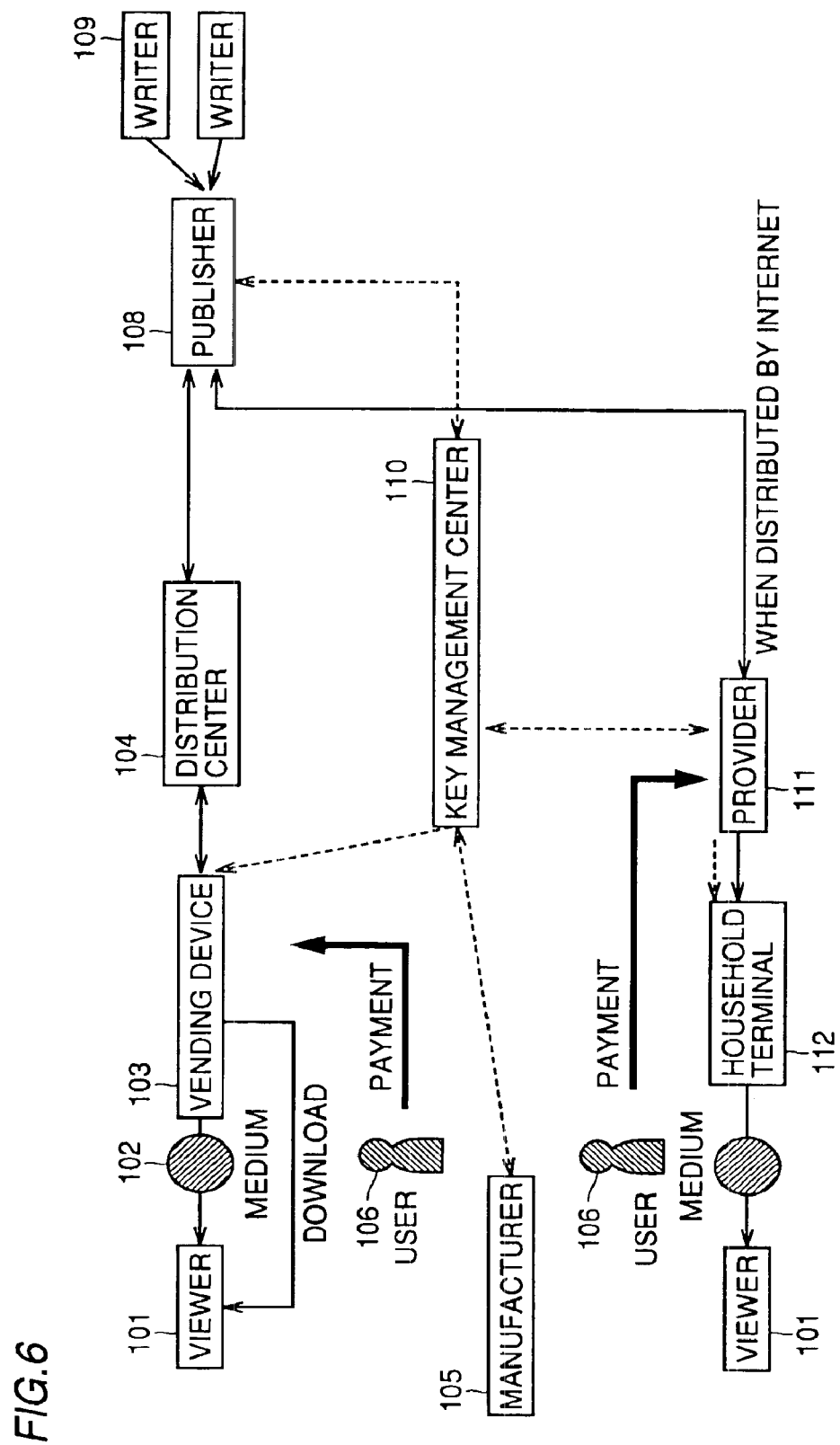
FIG. 6 is a diagram to describe the concept of an electronic copyrighted work distribution management system according to a fourth embodiment of the present invention.

FIG. 6 shows the concept of an electronic copyrighted work distribution management system according to a fourth embodiment of the present invention. An electronic book display apparatus (referred to as "viewer" hereinafter) 101 reproduces and displays digital data corresponding to the contents of the electronic book (referred to as "encoded contents" hereinafter since the data is generally encoded) provided from an electronic book sales apparatus (referred to as "vending device" hereinafter) 103.

Vending device 103 provides encoded contents via a medium 102 or a communication line to a user 106. Medium 102 can have digital data recorded, and is formed of a magneto-optical disk, optical disk, magnetic disk, hard disk, magnetic tape, IC card, and the like that can have data read out by a device such as a personal computer. Vending device 103 internally stores electronic book data to provide to the user the encoded contents stored internally or distributed from a distribution center 104 upon request of the encoded contents and charge accounting by user 106.

A publisher 108 edits or polishes the copyrighted work written by a writer 109 to convert the copyrighted work into an electronic form to produce encoded contents. The produced encoded contents are distributed to a distribution center 104 through wire such as a communication line or through radio such as a satellite according to a request from distribution center 104.

A manufacturer 105 provides a viewer 101 to user 106. In providing viewer 104 to user 106, a user key is embedded in viewer 101. That user key is also provided to a key information management apparatus (referred to as "key management center" hereinafter) 110. As will be described afterwards, decoding of the encoded contents is effected by viewer 101 through this user key.

Key management center 110 administers and issues key data and the like that will be described afterwards through communication by wire or radio with vending device 103, manufacturer 105, or publisher 108. For the sake of simplification, only one of each apparatus is connected to the electronic copyrighted work distribution management system of FIG. 6. In general, a plurality of each apparatus are connected.

Electronic book data can also be distributed via the Internet. In this case, a provider 111 distributes electronic book data to a household terminal 112 (for example, a personal computer), and the value with respect to the encoded contents is paid to provider 111. The electronic book data stored in provider 111 is distributed from publisher 108. Provider 111 can be realized with the function equal to that of distribution center 104. Household terminal 112 can be realized with a function equal to that of vending device 103.

Figure 7:
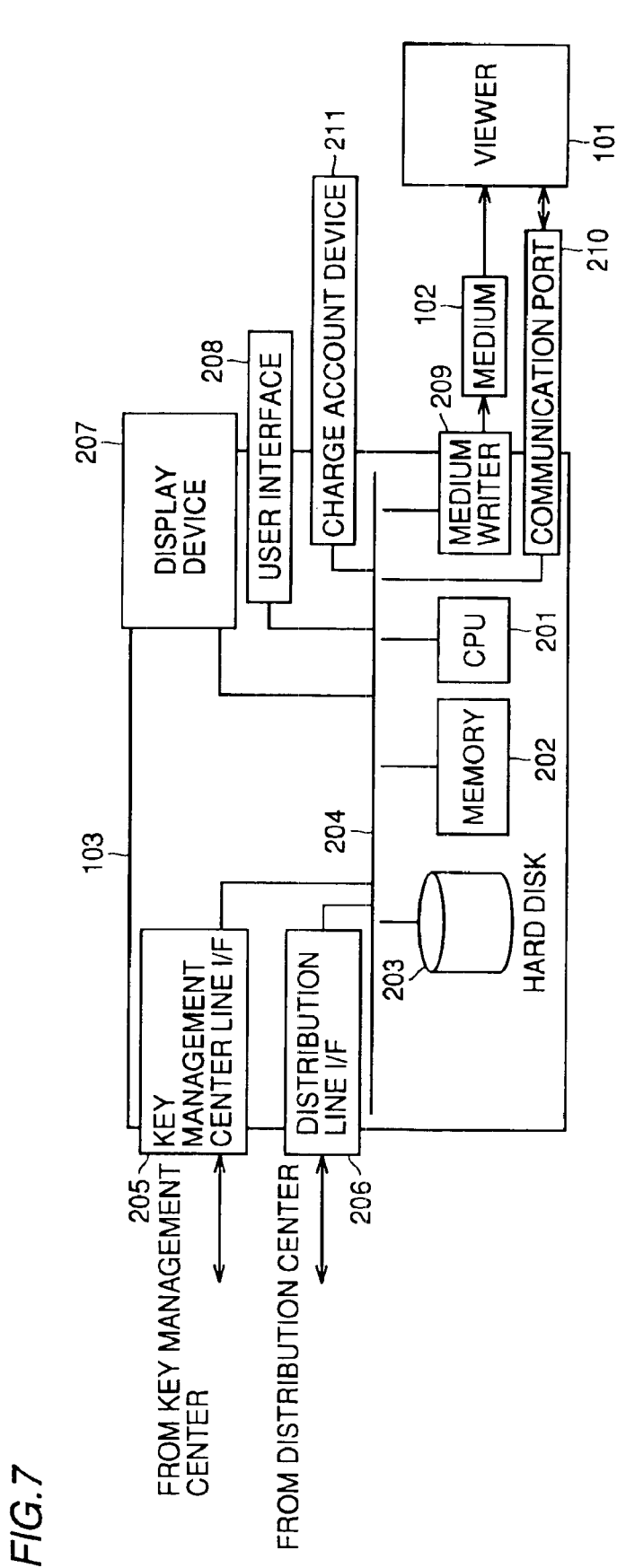
FIG. 7 is a block diagram showing a schematic structure of a vending device 103.

FIG. 7 is a block diagram showing a schematic structure of a vending device 103 of FIG. 6. Vending device 103 includes a CPU 201 providing the entire control of vending device 103, a memory 202 storing the processing contents, program and the like, a hard disk 203 storing a plurality of encoded contents and auxiliary information to properly reproduce or display the encoded contents, a key management center line I° F. (interface) 205 carrying out communication with key management center 110 through a communication line, a distribution line I/F 206 carrying out communication with distribution center 104 via a communication line, a display device 207 displaying information to the user of vending device 103, a user interface 208 used by the user to search for a desired electronic book or to select an electronic book to be purchased, a medium writer 209 writing electronic book data into a medium 102, a communication port 210 carrying out communication with a viewer 101, a charge account device 211 confirming the money or the contents of a prepaid card in exchange for purchasing the encoded contents by the user and settling the charge account, and an internal bus 204 connecting these components.

Figure 8:
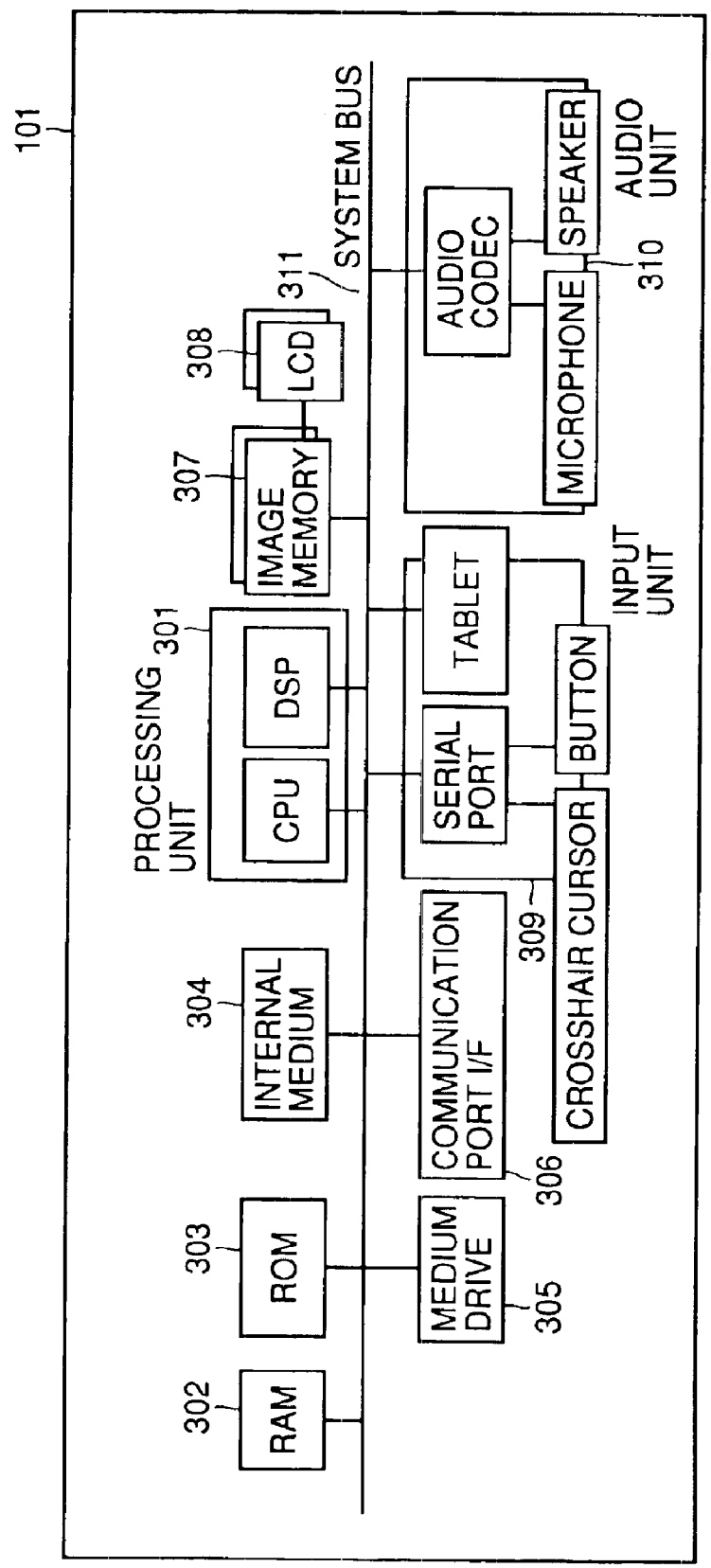
FIG. 8 is a block diagram showing a schematic structure of a viewer 101.

FIG. 8 is a block diagram showing a schematic structure of viewer 101. Viewer 101 includes a processing unit 301 providing the entire control of viewer 101, and formed of a CPU that carries out various operational processing and a DSP (Digital Signal Processor), a RAM 302 temporarily retaining information used by processing unit 301, a ROM 303 storing a processing program executed by processing unit 301, a user key which is the specific information of viewer 101, and the like, an internal medium 304 storing encoded contents read from vending device 103, a medium drive 305 formed of a disk drive or the like reading out the encoded contents from medium 102, a communication port I/F 306 carrying out communication with vending device 103 through a communication line, an image memory 307 storing an image (contents information) to be provided to a user after the encoded contents are decoded, an LCD (Liquid Crystal Device) 308 displaying the image according to the contents stored in image memory 307, an input unit 309 formed of a serial port converting the status of a crosshair cursor and button into serial data for output, a tablet, or the like, an audio unit 310 formed of an audio codec or the like to encode audio input through a microphone, reproduce encoded music, for output from a speaker, and a system bus 311 connecting these components.

Figure 9:
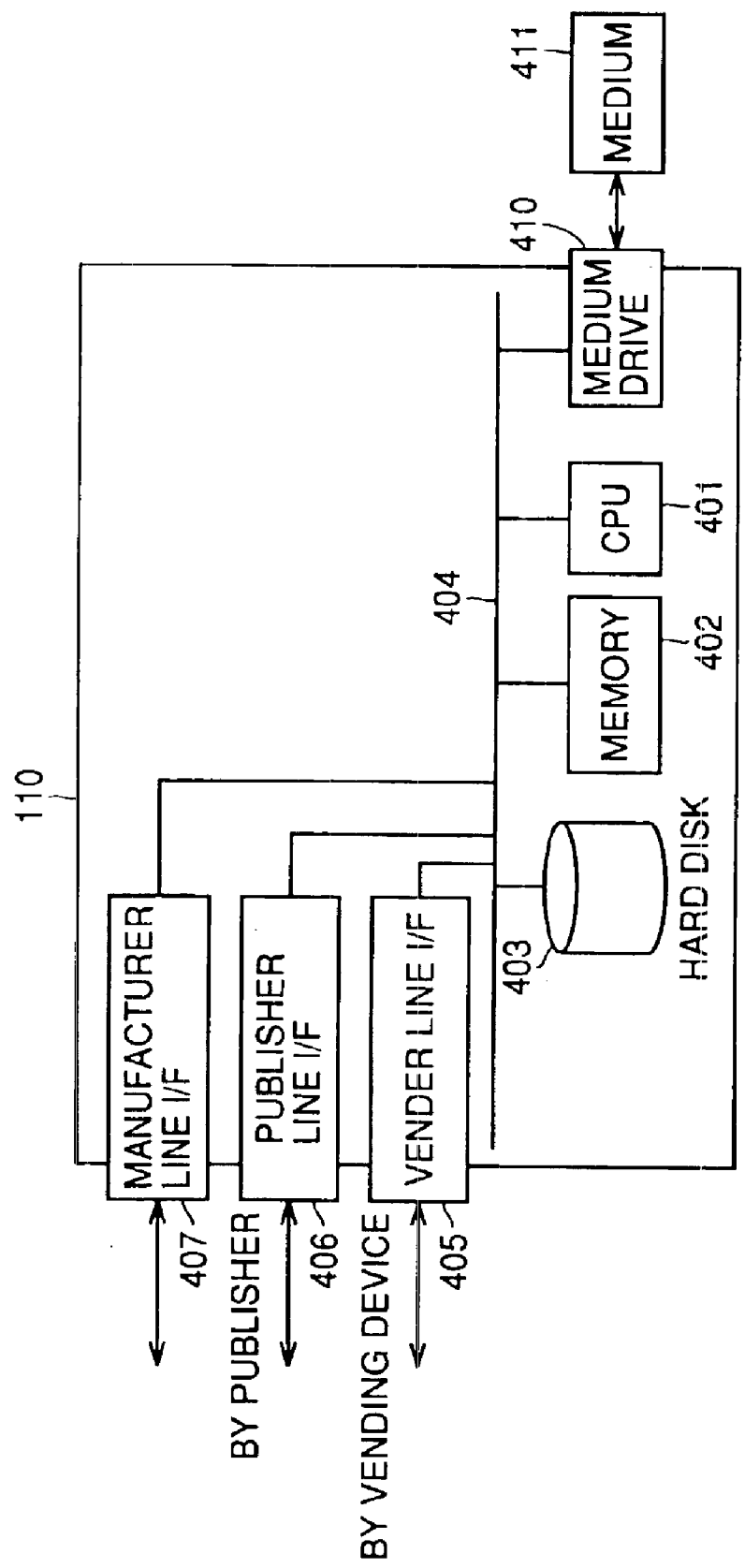
FIG. 9 is a block diagram showing a schematic structure of a key management center 110.

FIG. 9 is a block diagram showing a schematic structure of key management center 110. Key management center 110 includes a CPU 401 providing the entire control of key management center 110, a memory 402 storing the processing contents, program, and the like, a hard disk 403 storing information of a user key and the like that will be described afterwards, a vender line I/F 405 carrying out communication with vending device 103 through a communication line, a publisher line I/F 406 carrying out communication with a publisher 108 through a communication line, a manufacturer line I/F 407 carrying out communication with a manufacture 105 through a communication line, a medium drive 410 reading and writing data with respect to a medium 411 and an internal bus 404 connecting these components.

Figure 10:
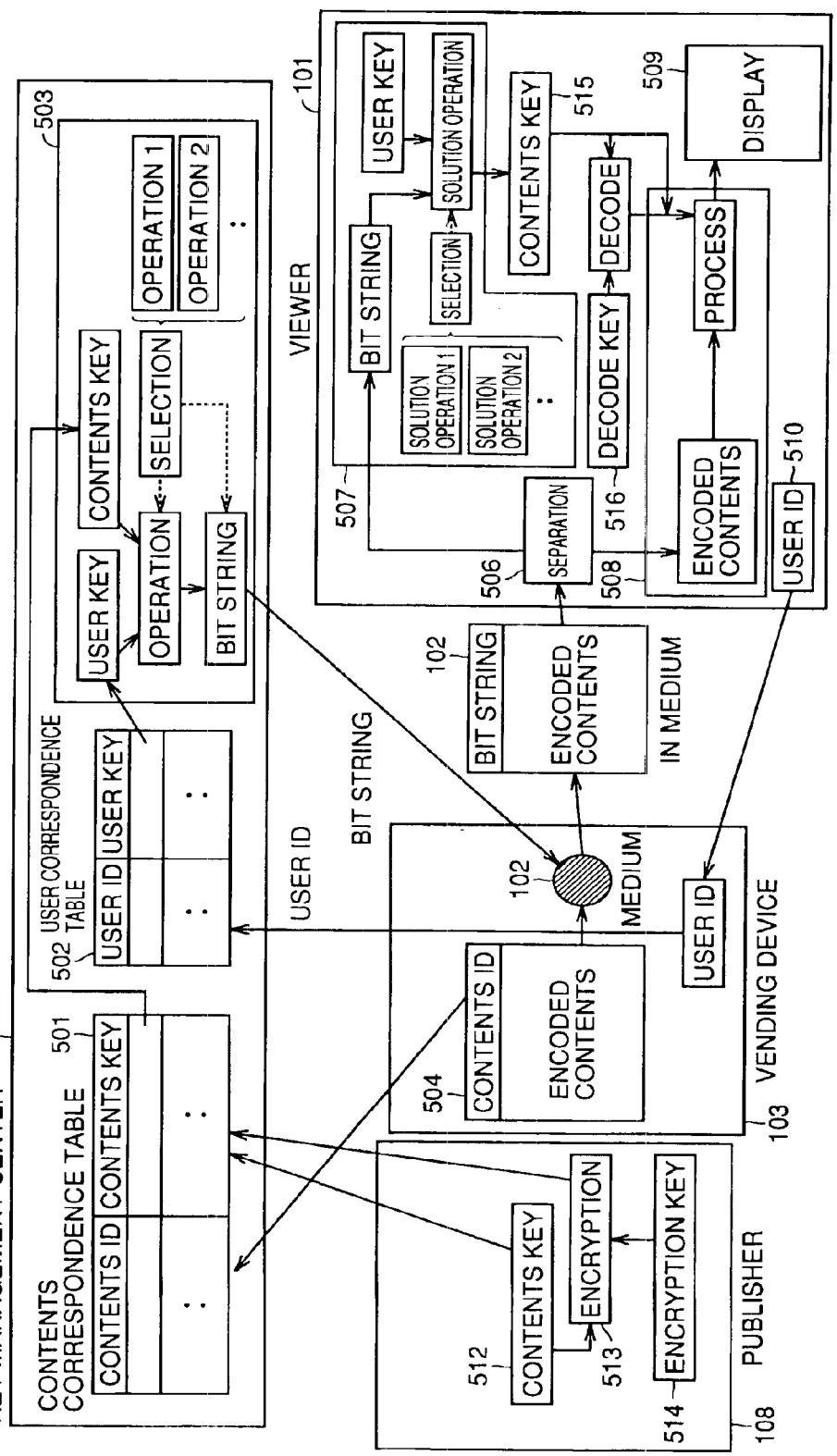
FIG. 10 shows the communication contents of key information and the like among a viewer 101, a vending device 103, a publisher 108 and a key management center 110.

FIG. 10 shows the communication contents such as key information and the like among viewer 101, vending device 103, publisher 108 and key management center 110. Key management center 110 includes a contents correspondence table 501 and a user correspondence table 502 in internal hard disk 403. Contents correspondence table 501 is stored with a contents ID that is information specific to the encoded contents of the electronic book produced by a publisher, and a contents key required to interpret, reproduce and display the encoded contents at viewer 101 in a pair. It is to be noted that a plurality of contents keys may be stored in correspondence with one contents ID.

The contents ID in contents correspondence table 501 can be produced by any of the methods below.

(1-1) Key management center 110 preassigns a contents ID for each publisher 108.

(1-2) Key management center 110 generates a contents ID each time in response to a request from publisher 108.

The contents key in contents correspondence table 501 is produced by a publisher by any of the methods below, and transmitted to key management center 110.

(2-1) Publisher 108 generates a contents key corresponding to the aforementioned contents ID, and sends the set of a contents ID and a contents key to key management center 110. Key management center 110 adds the set of contents ID and contents key into contents correspondence table 501.

(2-2) The contents ID obtained by the foregoing (1-1) or (1-2) is transmitted to key management center 110. Key management center 110 produces an encode key 514 and a decode key 515 of the contents corresponding to that contents ID, and sends only encode key 514 to publisher 108. Publisher 108 encodes the contents of an electronic book using encode key 512 transmitted from key management center 110. Key management center 110 adds the set of a contents ID and a contents key (decode key) to contents correspondence table 501.

Instead of assigning a contents ID and contents key for each contents of an electronic book, the same contents ID and contents key can be set in correspondence to all the contents. Alternatively, one contents ID and contents key can be set in correspondence for each publisher.

User correspondence table 502 is recorded with a set of a user ID which is the information specific to user 106 or viewer 101, and a user key that is required in interpreting, reproducing and displaying the encoded contents at a corresponding viewer 101. The user ID and user key in user correspondence table 502 are produced by any of the methods below.

(3-1) Key management center 110 produces a user ID and user key for each viewer 101 and adds the produced set to user management table 502, and then sends the set to user 106 or manufacturer 105.

(3-2) Key management center 110 produces a user ID for each viewer 101 and transmits the produced user ID to manufacturer 105. Manufacturer 105 generates a user key and embeds the user key into viewer 101 upon receiving the user ID. Then, manufacturer 105 transmits the set of a user ID and user key to key management center 110. Key management center 110 adds into user correspondence table 502 the received set of user ID and user key.

Instead of assigning a user ID and a user key for each viewer 101 as described above, the same user ID and user key can be assigned to all viewers 101. Alternatively, the set of one user ID and user key can be assigned to a particular viewer such as a plurality of viewers installed at a library, school, or the like. Although vending device 103 and key management center 110 are described as separate apparatuses in the electronic copyrighted work distribution system in the present embodiment, the function of key management center 110 can be incorporated in vending device 103.

The procedure of interpreting, reproducing and displaying the encoded contents using viewer 101 by user 106 will be described hereinafter.

When user 106 obtains encoded contents from vending device 103, user 106 refers to display device 207 of vending device 103 to select the encoded contents that is to be purchased using user interface 208, and provides connection with viewer 101 and communication port 210, if necessary. Following confirmation of viewer 101 being connected to communication port 210, CPU 201 in vending device 103 obtains and stores in memory 202 a user ID 510 retained in viewer 111. This user ID may be input directly by user 106 via user interface 208.

A plurality of the sets of encoded contents and corresponding contents ID 504 are stored for every predetermined unit, for example, for every title of an electronic book, in hard disk 203 of vending device 103. CPU 203 extracts encoded contents and a contents ID from hard disk 203 corresponding to the book selected by user 106.

Then, the value corresponding to the electronic book selected by user 106, for example money or a prepaid card, is inserted into charge account device 211 by user 106. Charge account device 211 confirms the value thereof and settles the account. Upon reception of the notification of completion of settlement from charge account device 211 by CPU 201, the user ID and contents ID stored in memory 202 are transmitted to key management center 110 via key management center line I/F 205. When the user ID is unitary, transmission of the user ID to key management center 110 is not effected. For example, in the case where the same user ID and user key are assigned to all the users, transmission of the user ID from vending device 103 is omitted.

Key management center 110 receives and stores into memory 402 the contents ID and user ID from vending device 103 via vender line I/F 405. CPU 401 of key management center 110 looks into contents correspondence table 501 to extract and store into memory 402 the contents key corresponding to the received contents ID, and also looks into user correspondence table 502 to extract and store into memory 402 the user key corresponding to the received user ID.

Figure 11:
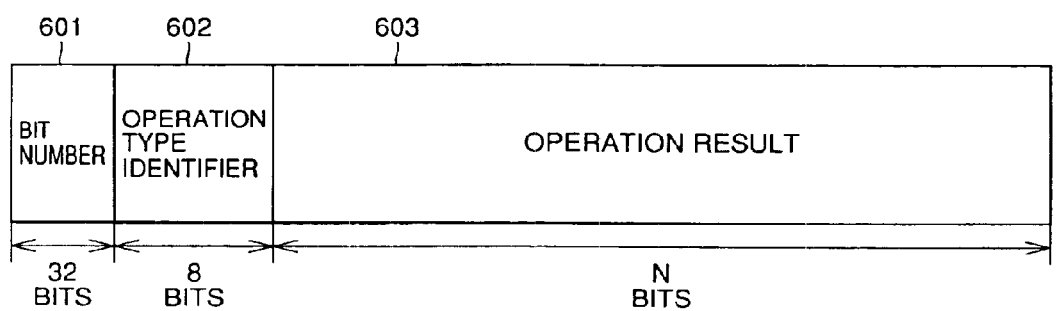
FIG. 11 shows an example of a bit string generated by an operation module 503.

Then, an operation module (formed of CPU 401 and the like) 503 receives the extracted user key and contents key, and applies operation thereon to generate and output a train of bits as auxiliary information. FIG. 11 shows an example of the bit string generated by operation module 503. This bit string includes a bit number of region 601 storing a bit number indicating the length of the bit string, an operation type identifier region 602 storing an identifier indicating the type of operation applied on the user key and the contents key, and an operation result region 603 storing the operation result obtained by applying an operation on the user key and contents key. The operation result stored in operation result region 603 is data of a variable length.

Operation module 503 selects an operation from a plurality of operation programs stored in memory 402 or hard disk 403, and stores an identifier of the selected operation into operation type identifier region 602. Operation module 503 applies the selected operation on the input user key and contents key, and stores the operation result in operation result region 603. Then, operation module 503 calculates the length of the entire bit string and stores the calculated value into bit number region 601.

An operation F carried out by operation module 503 calculates one output value from two input values, and satisfies the condition below.

(Condition) An operation G of $Y=G(B X)$ is present with respect to the operation result obtained by $B=F(X, Y)$, where X represents the user key and Y represents the contents key.

In the present embodiment, "operation" is defined as F, and "solution operation" is defined as G. There are an infinite number of combinations of operation F and solution operation G. Some examples are shown here.

(1) The combination of $F(X, Y)=X+Y$ and $G(B, X)=B-X$.

(2) The combination of $F(X, Y)=X \times Y$ and $G(B, X)=B \div X$.

(3) The combination of $F(X, Y)=X-Y$ and $G(B, X)=B+X$.

(4) The combination of $F(X, Y)=X \div Y$ and $G(B, X)=B \times X$ (provided that X is not 0).

(5) The combination of $F(X, Y)=X^{\wedge}Y$ and $G(B, X)=Log \times B$ (provided that $X^{\wedge}Y$ indicates an exponential operation).

(6) The combination of $F(X, Y)=Y>X$ and $G(B, X)=B<X$ (provided that, in Y>X, numeric Y is a binary bit string, rotated rightwards X times, and in B<X, numeric B is a binary bit string, rotated leftwards X times).

A solution operation G is preset in correspondence with respect to operation F. After an operation type identifier is assigned to each set of a user key X and a contents key Y, the set of operation F and the operation type identifier is stored in key management center 110. The set of corresponding solution operation G and the operation type identifier is prestored in viewer 101.

Key management center 110 transmits the bit string including the operation result obtained by the foregoing operation and the operation type identifier to vending device 103. CPU 201 of vending device 103 has the set of the bit string received from key management center 110 and the encoded contents preselected by user 106 into medium 102 by medium writer 209.

Instead of receiving one type of bit string with respect to one encoded contents by vending device 103 and writing the same into medium 102, key management center 110 may be requested to produce a plurality of bit strings with respect to one encoded contents according to the charge account status of user 106 to receive and write into medium 102 the plurality of bit strings. More specifically, vending device 103 has the charge account information corresponding to the encoded contents stored in a contents charge account information table 1201 to send a different contents ID corresponding to the charge account information to key management center 110.

Figure 12:
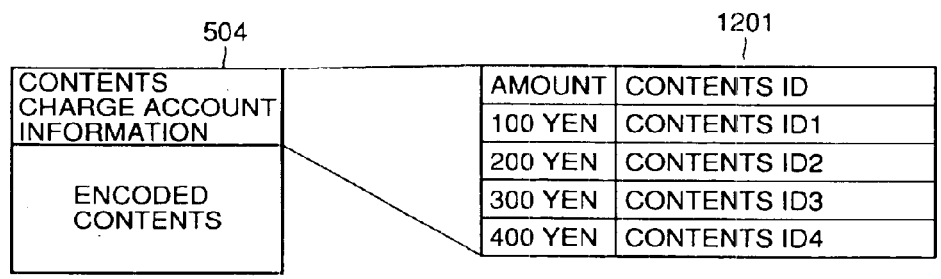
FIG. 12 shows an example of a contents charge account information table 1201.

FIG. 12 shows an example of contents charge account information table 1201. For example, when user 106 inserts 100 Japanese yen, vending device 103 transmits only a contents ID1 to key management center 110 and receives only the bit string corresponding to contents ID1. When user 106 inserts 300 yen, vending device 103 transmits contents ID1, contents ID2 and contents ID3 to key management center 110, and receives three bit strings corresponding to contents ID1, contents ID2 and contents ID3. More specifically, a contents ID of a different type or number is transmitted to key management center 110 according to the charge account status, and a bit string corresponding to that contents ID is received from key management center 110. The set of the encoded continents selected by user 106 and the corresponding bit string is stored in medium 102.

The procedure of processing the set of the encoded contents and bit string recorded in medium 102 by viewer 101 will be described with reference to FIG. 10. Processing unit 301 of viewer 101 includes a separation module 506 separating the bit string recorded in medium 102 from the encoded contents, a solution operation module 507 carrying out a solution operation on operation result 603 included in the bit string separated by separation module 506 to generate a contents key, and a decode module 508 decoding the encoded contents using a contents key.

Separation module 506 separates the bit string recorded in recording medium 102 from the encoded contents, and transfers the bit string to solution operation module 507 and the encoded contents to decode module 508.

Solution operation module 507 extracts an operation result B stored in operation result region 603 in the bit string transferred from separation module 506, and extracts operation type identifier 602 to select solution operation G. By carrying out solution operation G on user key X in solution operation module 507 and operation result B, a contents key Y is generated and transferred to decode module 508.

Decode module 508 decodes the encoded contents using the contents key transferred from solution operation module 507 and displays the contents at LCD 308. Details thereof will be described afterwards.

In producing encoded contents corresponding to an electronic book, publisher 108 may carry out a predetermined encryption on contents key 512 using an encryption key 514 instead of transmitting the original contents key 512 to key management center 110 and send it to key management center 110 as the contents key. In this case, viewer 101 carries out decoding using decode key 516 on the contents key generated by solution operation module 507 to obtain the original contents key 512.

Figure 13:
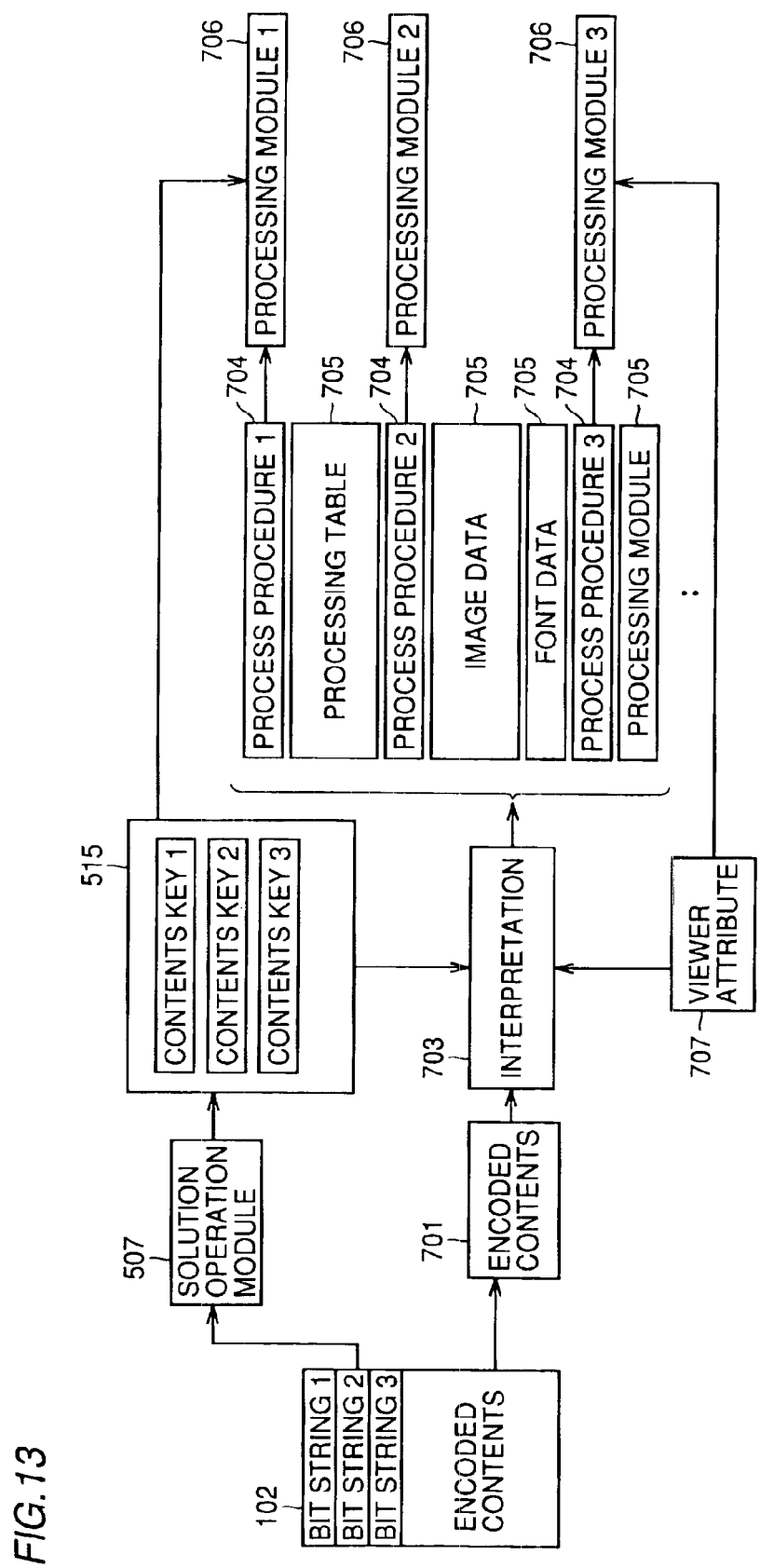
FIG. 13 is a diagram to describe the processing procedure of interpreting encoded contents by viewer 101 to reproduce and display the contents.

The processing procedure of interpreting, reproducing and displaying the encoded contents by viewer 101 will be described with reference to FIG. 13.

Upon insertion of a medium 102 into a medium drive 305 of viewer 101, processing unit 301 reads out the bit string and encoded contents from medium 102 to generate a contents key 515 by the foregoing processing procedure. When three bit strings are added to the encoded contents as shown in FIG. 13, solution operation module 507 generates and stores into RAM 302 three types of contents keys. An interpretation module 703 interprets encoded contents 701 to divide the same into a plurality of processing procedures 704 and a plurality of data modules 705. Each processing procedure 704 is executed by a corresponding processing module 706. Interpretation module 703 and each processing module 706 are realized by processing unit 301 executing a predetermined program.

Processing module 706 corresponding to processing procedure 704 executes the process while appropriately referring to data module 705 separated by interpretation module 703. Data module 705 includes image data that will be described afterwards, processing table, font data, and processing module to provide a processing function that is not present in viewer 101. When interpretation module 703 and processing module 706 carry out the process, contents key 515 generated by solution operation module 507 is referred to appropriately.

FIGS. 14A–14D show the display attributes of viewer 101. Viewer 101 of FIG. 14A includes two LCDs of 768× 1024 pixels and monochrome 8 tones. A different screen can be displayed in each LCD.

Figure 14:
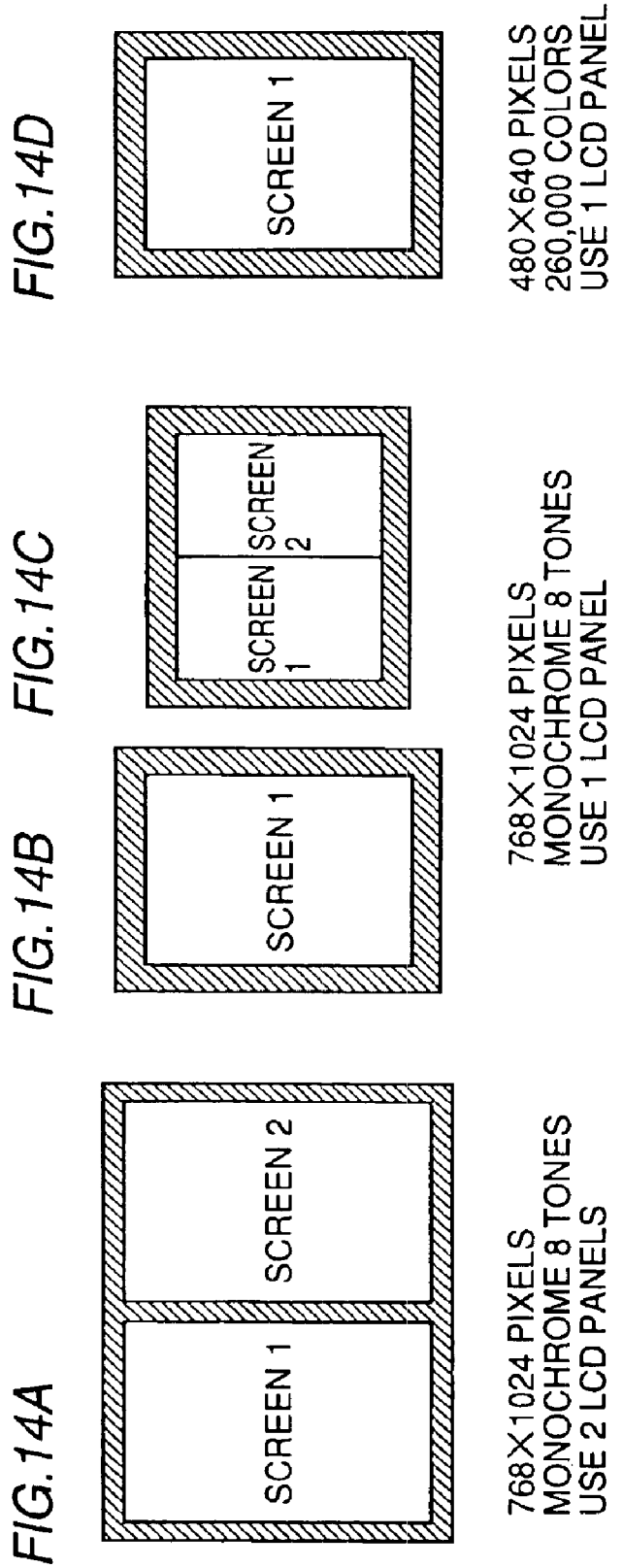
FIGS. 14A–14D show display attributes of viewer 101.

Viewer 101 of FIG. 14B includes only one LCD having the number of pixels and tones identical to those of the LCD of FIG. 14A. Only display data of one screen can be displayed. Viewer 101 of FIG. 14C includes only one LCD having the number of pixels and tones identical to those of the LCD of FIG. 14A. Display data of two screens can be shrunk to be displayed together.

Viewer 101 of FIG. 14D includes one LCD of 480×640 pixels and 260,000 colors. Display data of only one screen can be displayed.

Figures 15, 16:
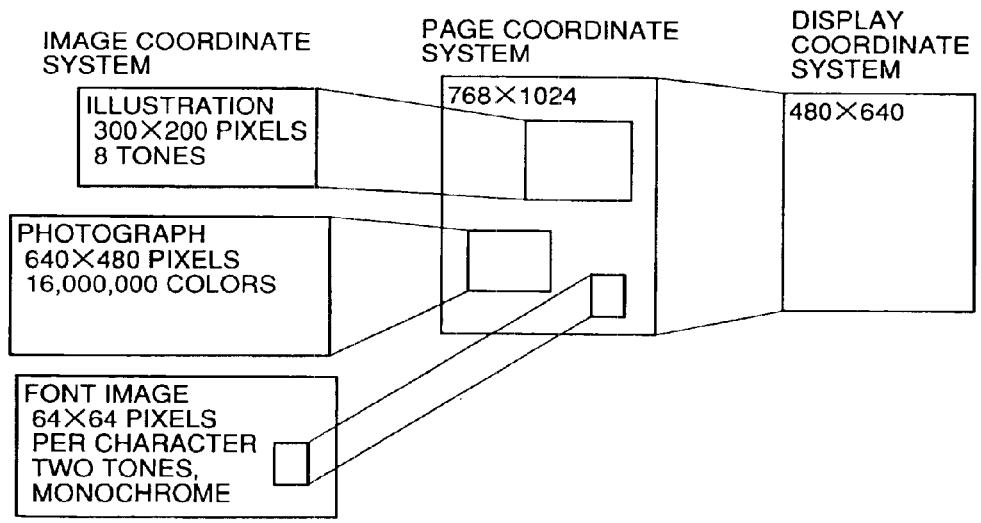
FIG. 15 shows display attributes corresponding to the display format of viewer 101 of FIGS. 14A–14D.
FIG. 16 is a diagram to describe the coordinate system of the display screen of viewer 101.

The display attributes of each viewer 101 are registered in RAM 302 corresponding to the display format. The display attributes include the number of LCDs (the number of LCD incorporated in viewer 101), the LCD number of pixels (the number of pixels in the horizontal direction and vertical direction of the LCD in viewer 101), the LCL color (monochrome/color distinction, number of gradation tones, number of colors), the display direction (indicating whether user 106 views the LCD with the screen set horizontally or vertically), the number of pages (indicating how many pages are to be displayed in the screen of LCD 1), and the like. The display attributes corresponding to the display format of viewer 101 of FIGS. 14A–14D are shown in FIG. 15.

The coordinate system of the display screen of viewer 101 of the present embodiment will be described with reference to FIG. 16. The coordinate system includes three types, i.e., the image coordinate system, the page coordinate system and the display coordinate system, with the left top as the origin in units of pixels. The image coordinate system serves to describe the original image data to be displayed. FIG. 16 shows an illustration (300×200 pixels, 8 tones), a photograph (640×480 pixels, 16,000,000 colors), and a font image (64×64 pixels per text, two tones). The image coordinate system is the virtual coordinate provided to specify the location and size of the image on the page to be displayed. The display coordinate system is defined corresponding to the foregoing display attributes.

When interpretation module 703 interprets and divides the contents described in encoded contents 701, each processing module 706 converts the display object described by the image coordinate system into the display coordinate system for display on LCD 308.

FIGS. 17 and 18 show examples of encoded contents 701. The encoded contents are formed having a plurality of data and processing programs called modules described. Interpretation module 703 continuously reads out each module and causes each processing module 706 to execute the process to reproduce the contents.

Steps 1–3 shown in FIG. 17 correspond to data required for the entire contents. Interpretation module 703 first reads in this data. By the subsequent reading of the data on a page-by-page basis by interpretation module 703, the contents is reproduced and displayed on a page-by-page basis. One module includes a module name, starting delimiter, and ending delimiter. For example, the image data starting delimiter (102)–the image data ending delimiter (1008) represent one module. A module name is assigned to the starting delimiter and ending delimiter.

Interpretation module 703 extracts the module name for each module, and transfers the module to processing module 706 that corresponds to that module name. Processing module 706 to which the module has been transferred executes the process of that module by, for example, calling up a subroutine program. For example, when interpretation module 703 interprets the IMAGE module (1002–1008) of FIG. 17, this IMAGE module is transferred to the IMAGE processing module. The IMAGE processing module executes the subsequent processes.

Each module of FIGS. 17 and 18 includes a region specifying the contents key. When a contents key is specified in the interpretation of each module by interpretation module 703, the contents key generated by the foregoing process is searched for, and transferred to each processing module 706 after the encoded contents is decoded.

The processing contents of each module of FIGS. 17 and 18 will be described hereinafter.

(1) IMAGE Processing Module (Module Name: IMAGE)

Encoded image data is transferred by the system indicated by the compression method identifier, and stored in RAM 302. When the encoded image data is transferred properly, an image data ID number is assigned to the region in which this image data is stored.

(2) TABLE Processing Module (Module Name: TABLE)

The table data indicating the image processing method is decoded using the specified contents key and transferred to be stored in RAM 302. When the table data is transferred properly, the table ID number is assigned to this table storing region.

FIG. 19 shows an example of this processing table. For example, when a magnification process is to be carried out when a process ID "1" is specified, the edge enhancement process is carried out after the image data has been subjected to the bi-linear interpolation process. When a shrinking process is to be carried out, the simple shrinking process is carried out on the image data. When the reducing number of colors is to be carried out, the image data is subjected to the bit slice process. In this bit slice process, the data of the lower bits are discarded out of the color data or tone data of the image represented by a plurality of bits.

(3) MODULE Processing Module (Module Name: MODULE)

The processing module itself is transferred and stored into RAM 302 as the processing module. When the processing module has been transferred properly, the processing module name is added to the region storing this processing module. This module processing module is used when a process other than the processing modules preregistered in viewer 101 is to be executed.

(4) PAGE Processing Module (Module Name: PAGE)

The beginning of the page data is indicated, and the number of pixels in the x direction and the number of pixels in the y direction of a page are stored in RAM 302 as the attributes of the page data. In the case of an electronic book, the region between the descriptor indicating the beginning of the page data and the descriptor indicating the end of the page data corresponds to each page.

(5) PUTIMAGE Processing Module (Module Name: PUTIMAGE)

After a process on image data having the specified ID present in RAM 302 is carried out, the processed image data is transferred to image memory 307 and displayed at LCD 308. The processing procedure of this PUTIMAGE processing module will be described in detail hereinafter.

Figure 20:
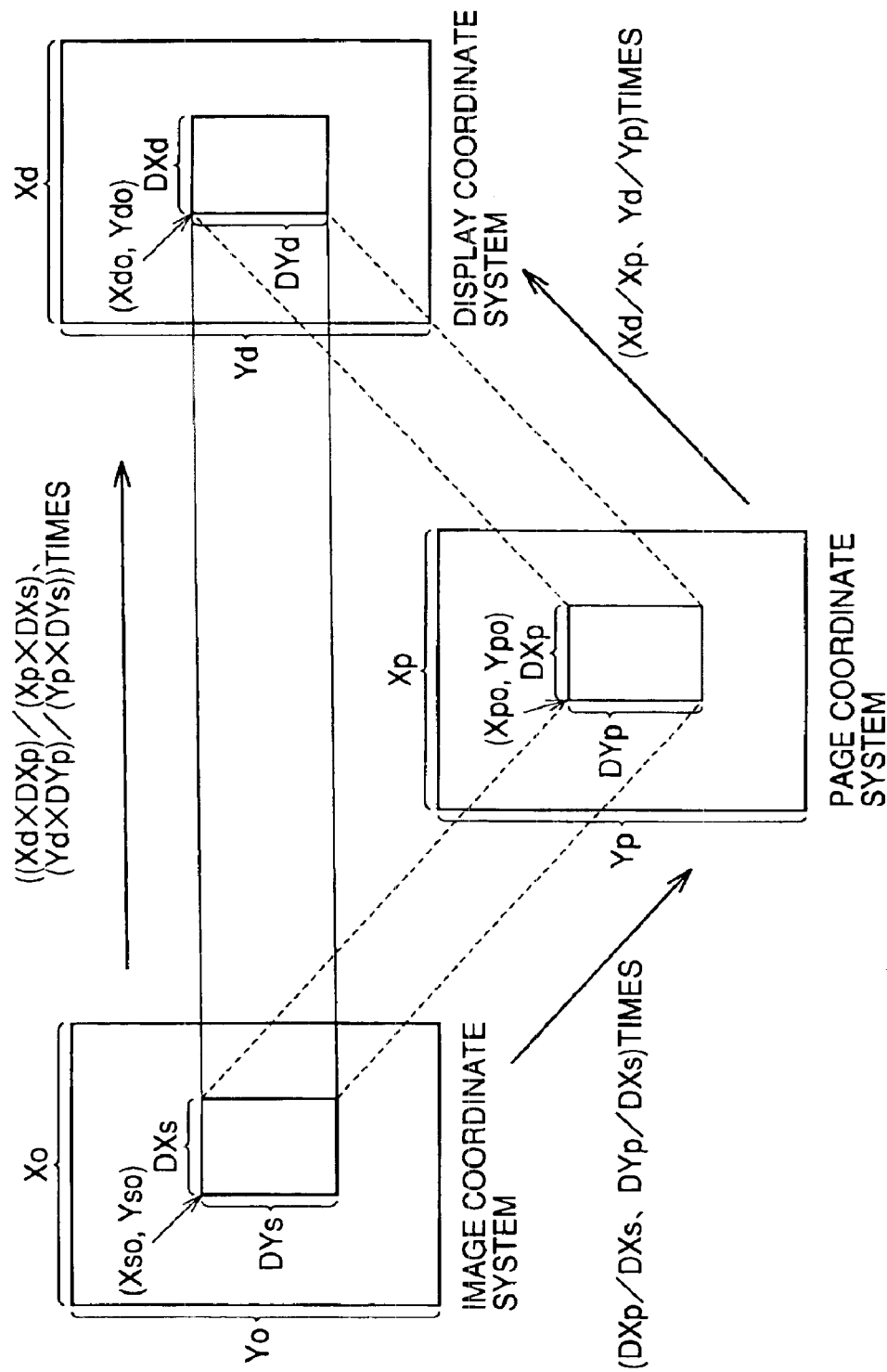
FIG. 20 is a diagram to describe the processing procedure of a PUTIMAGE processing module.

FIG. 20 is a diagram to describe the processing procedure of the PUTIMAGE processing module. A PUTIMAGE processing module 706 reads out from the corresponding region and image data in the module the number of pixels (Xo×Yo) of the original image (image coordinate system) of the display object, the original image region starting point coordinates (Xso, Yso), the number of pixels of the region of the original image (DXs×DYs), the number of pixels (Xp×Yp) of the page (page coordinate system), the page region starting point coordinates (Xpo, Ypo) and the number of pixels of the page region (DXp×DYp).

PUTIMAGE processing module 706 extracts the number of pixels (Xd×Yd) of the display region (display coordinate system), the region starting point coordinates (Xdo, Ydo) of the display region, and region number of pixels (DXd×DYd) of the display region from RAM 302 to carry out a magnification/shrink process. The magnification scale of the magnification/shrink process becomes the entire magnification scale when the magnification/shrink process to convert from the image coordinate system into the page coordinate system is carried out, followed by the magnification/shrink process to convert from the page coordinate system to the display coordinate system. In the present embodiment, the region of the original image is increased/reduced by the following magnification scale.

Magnification scale of X direction: (Xd×DXp)/(Xp×DXs) times

Magnification scale of Y direction: (Yd×DYp)/(Yp×DYs) times

The magnification/shrink process is executed when the processing table of FIG. 19 is referred to as the processing method to be selected.

When the number of colors of the original image is greater than the number of colors that can be displayed (depending upon the display attribute), the processing table of FIG. 19 is referred to and the reducing number of colors is selected to be executed.

Display is effected by the image subjected to the above-described magnification/shrink process and reducing number of colors written into the region of image memory 307 with (Xdo=(Xd×Xpo)/Xp, Ydo=(Yd×Ypo)/Yp) in the display coordinate system as the origin.

(6) CHAOS Processing Module (Module Name: CHAOS)

The pixel value of the image data with the specified ID is altered by the function set below and then transferred to image memory 307, whereby display is effected at LCD 308. This CHAOS process will be described in detail hereinafter.

The process set forth in the following is carried out on the image data having the specified ID stored in RAM 302 (represented as "I0 (z)" hereinafter) using the processing parameter in the module to obtain a processed image (called "resultant image" hereinafter). When the image is formed of X0×Y0 pixels, $0 \leq z < (X0 \times Y0)$ is established, where z represents the index of the image data.

With a (0)=A, the following operation is repeated n times.

$$a(n+1)=P(1-a(n)) \times a(n)$$

$$z=a(n+1) \times X0 \times Y0$$

$$I1(z)=R(I0(z))$$

where A, P and N are numerics recorded in the module. A is the initial value, and 0<A<1. P is the processing parameter recorded in the module, and takes a random value, preferably $3.6 \leq P \leq 4$. N is the number of repetition. Function R implies a bit inversion process, wherein R(x)=M−x when the value of I0 is 0 to M.

Resultant image I1 obtained by the above-described process is subjected to the magnification/shrink process and reducing number of colors in a manner similar to that of the PUTIMAGE processing module with reference to the parameters recorded in the module. The processed image is transferred to image memory 307 to be displayed.

In producing image data, it is assume on is carried out on the original image with the foregoing CHAOS function and parameter, and then compressed to be recorded in the encoded contents as encoded image data. If the encoded contents are simply decoded, an image modified by the CHAOS function will be displayed at LCD 308. Therefore, the proper image will not be displayed. By applying the foregoing CHAOS process after the encoded contents have been encoded, the proper image can be displayed at LCD 308. By actuating the CHAOS processing module only when there is a contents key in the module, a viewer 101 absent of the contents key cannot display the proper image.

A process may be carried out by defining a processing module using a random number function RAND, for example, instead of the CHAOS function. Although the picture quality of the displayed image and the size of the processing module differ in this case, an effect similar to that using the CHAOS function can be obtained. Although description has been provided as to a process of mixing/removing noise with respect to the image data by CHAOS, the noise mixture/removal by the CHAOS can be carried out similarly for other modules.

(7) Blur Process Module (Module Name: BLUR)

After applying a blur process which is one image processing method on the image data with the specified ID, the processed image is transferred to image memory 307, whereby a blurred object is displayed at LCD 308. By forcing the number of repetitions N to "0" when a contents key is specified in the module, the blur process is disabled. This blur process will be described in detail here.

With respect to the image data with the specified ID stored in RAM 302 (represented as I0 (x, y), the process set forth in the following is carried out using the processing parameter in the module to obtain the processed image (represented as resultant image I1 (x, y) hereinafter). When the image is formed of X0×Y0 pixels, the relationship of $0 \leq x < X0$, $0 \leq y < Y0$ is established, where x and y are the coordinate indexes of the image data.

The operation below is repeated N times for all the pixels, provided that I1=I0 when N=0, and the process of step 2 is carried out just once.

Step 1: I1 (x, y)=I0 (x, y)*M (P, x, y)

Step 2: Similar to the method of PUTIMAGE, image I1 is subjected to the magnification/shrink process and reducing number of colors, and transferred to image memory 307 to be displayed.

Step 3: Let I0 (x, y)=I1 (x, y), and the process from step 1 is repeated.

It is to be noted that P and N are parameters recorded in the module. *M (P, x, y) implies the moving average process using the mask of P×P centered about coordinates (x, y). When this BLUR processing module is executed, the image displayed will be gradually blurred if the corresponding contents key is absent. In contrast, the image with the corresponding contents key will not be displayed in a blurred manner. Thus, the proper image cannot be displayed with a viewer 101 that does not have a contents key.

A process may be carried out with a processing module defined using various image processing functions such as edge enhancement instead of function *M. Although the picture quality of the displayed image and the size of the processing module differ in this case, a similar effect can be obtained.

The process executed by the included contents (steps 1–10) of FIGS. 17 and 18 according to the above-described respective processing modules is summarized as below.

(Step 1)

By processing module 706, the IMAGE module process is executed. Since there is a contents key 1 in viewer 101 (refer to FIG. 13), the encoded image data subjected to a compression process by MH (Modified Huffman) encoding is subjected to an enhancing process. The image data is assigned the image data ID number of "1" and loaded into RAM 302 as the bit map image.

(Step 2)

By processing module 706, the TABLE module process is executed. Since there is a contents key 2 in viewer 101 (refer to FIG. 13), the table data is transferred and an ID number"1" is assigned to that table. That table is loaded into RAM 302 as the processing table. In the encoded contents of FIG. 17, the processing table is loaded properly since there is a contents key 2. It is to be noted that this processing table is not loaded 1=properly depending upon the charge account status by user 106 at vending device 103. There is a case where a process using this processing table may be disabled in subsequent processes.

(Step 3)

By processing module 706, the MODULE module process is executed. Since there is a contents key 3 in viewer 101 (refer to FIG. 13), the encoded processing module is decoded, a processing module name CHAOS is assigned, and loaded into RAM 02. Since this processing module may not be loaded properly depending upon the user's charge account status as in step 2, there is a case where a process using the CHAOS processing module may not be executed in the subsequent processes.

(Step 4)

By processing module 706, the PAGE module process is executed. Since a contents key is not specified in this module, the process is executed in all cases. More specifically, X pixel numbers 768 and Y pixel numbers 1024 of the page coordinate system are loaded into RAM 302 as the attributes of the page data to be used in the subsequent processes until a page ending delimiter/PAGE is read out.

(Step 5)

By processing module 706, the IMAGE module process is executed. Since there is a contents key 2 in viewer 101 and the specification of the page pixel number (768×1024) match the display attribute loaded at step 4, the encoded image data compressed by JBIG (Joint Bi-level Image Group) coding is subjected to an expansion process, assigned with the image data ID number of "2", and loaded into RAM 302 as bit map image. Since this IMAGE module is described in the PAGE descriptor, an unload operation from RAM 302 is effected when the page ending delimiter is interpreted.

(Step 6)

By processing mode 706, the IMAGE module process is executed. Since the specification of the page pixel number (480×640) does not match the display attribute loaded at step 4 although there is a contents key 2 in viewer 101, this process will not be carried out.

The images specified at steps 5 and 6 will not be loaded into RAM 302 at the same time since the process is carried out selectively depending upon the display attribute. This means that the image to be processed subsequently can be altered by the page pixel number. For example, since high picture quality display is not possible with a magnification/shrink process such as in a font image or the like depending upon the display format of viewer 101, the font image or the like is altered to allow accommodation thereof.

(Step 7)

By processing module 706, the IMAGE module process is executed. Since there is a contents key 3 in viewer 101 and there is no display attribute specification such as specification of the page pixel number, the encoded image data compressed by the JPEG (Joint Photographic Experts Group) coding method is subjected to an expansion process, assigned with the image data ID number of "3", and loaded into RAM 302.

For example, when a contents key specified in the IMAGE processing module is not present in viewer 101, the relevant image data is not loaded. As a result, there is a case where display on LCD 308 is not effected.

(Step 8)

By processing module 706, a PUTIMAGE module process is executed on the preloaded image of image data ID number "1". Since there is a contents key 2 in viewer 101 and there is no display attribute specification such as specification of the page pixel number, the PUTIMAGE module process is executed. Since the processing table with the ID number "1" used in this process is already loaded into memory 302, a process corresponding to the process ID "1" in the processing table (refer to FIG. 19) is used when an image process such as magnification/shrink process and reducing number of colors is required. Since the processing table may not be loaded depending upon the charge account status by user 106, there is a case where an image process is not carried out or where a predetermined default image process is carried out.

(Step 9)

By processing module 706, the BLUR module process is executed on the preloaded image data with image data ID of "3". Since there is not a contents key 4 in viewer 101, the image displayed at LCD 308 will become gradually blurred over time.

(Step 10)

By processing module 706, the CHAOS module process is executed on the preloaded image with image data ID "2" in RAM 302. Since there is a contents key 3 in viewer 101, a proper image is displayed at LCD 308 even in the case where the relevant image data is subjected to an image process with the CHAOS function. A similar process is executed thereafter according to the encoded contents.

The foregoing description was provided corresponding to the case where only one encoded contents is recorded in medium 102. In general, a plurality of contents are recorded for each title of an electronic book in medium 102.

Interpretation, reproduction and display are effected in the units of contents according to the charge account status.

Although a process related only to image data has been provided, audio reproduction module, text data display module, and the like can be described in the encoded contents, and the execution controlled according to the presence of a contents key.

In the case where a process is to be carried out at each apparatus used in the electronic copyrighted work distribution system of the present embodiment, the process can be stored in a computer-readable medium such as a magnetic disk, an optical disk, an IC card, or the like. The process can be installed appropriately in a hard disk to execute the program thereof. Also, the process may be supplied to each apparatus via a communication line.

Figure 21:
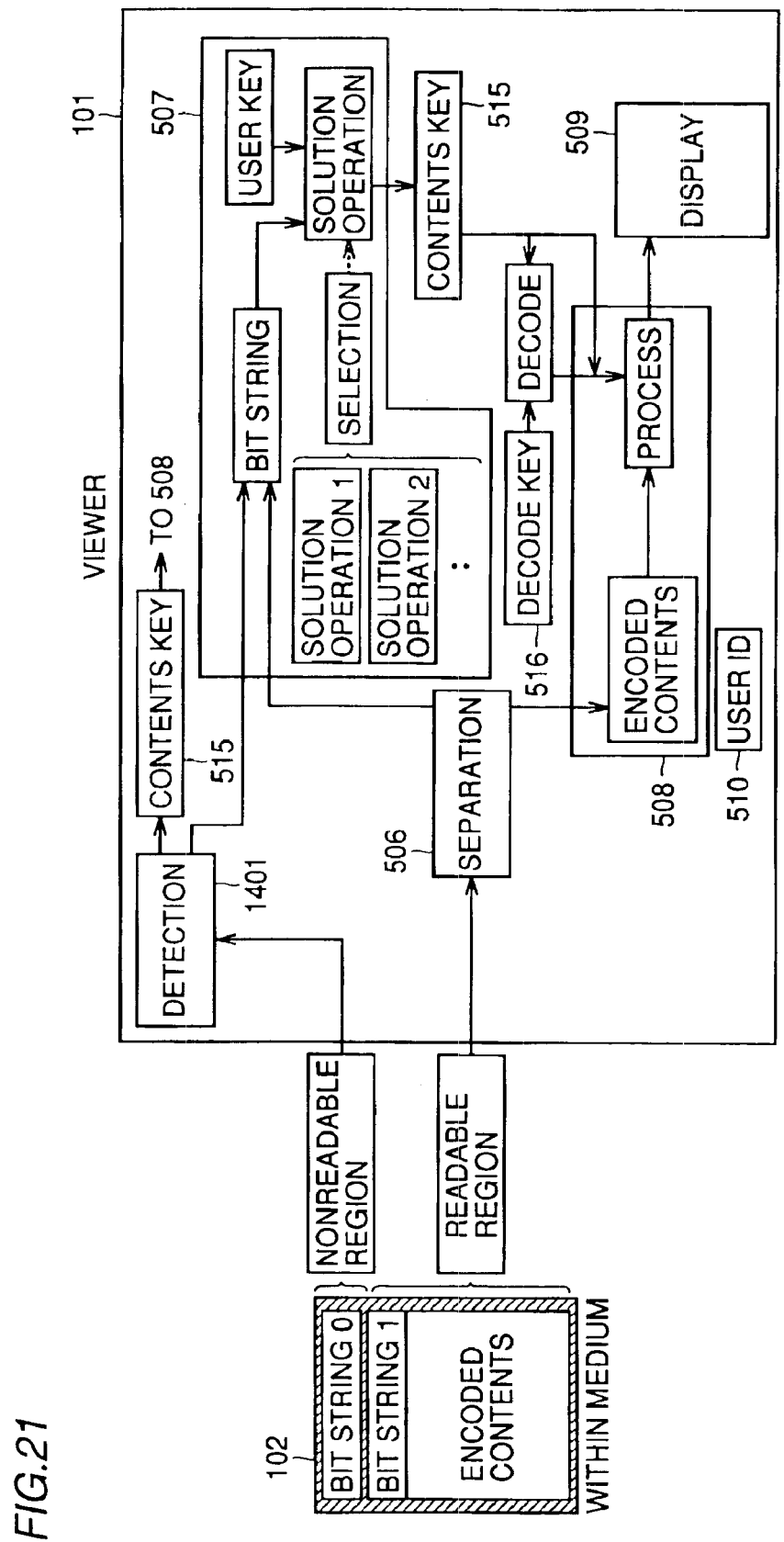
FIG. 21 is a diagram to describe schematically the process of viewer 101 when there is a bit string in a nonreadable region of a medium 102.

FIG. 21 is a diagram to schematically describe the process of viewer 101 when the foregoing bit string is present in a nonreadable region of medium 102. In medium 102, a bit string 1 and encoded contents are recorded in the readable region, whereas a bit string 0 is recorded in the nonreadable region. A detection module 1401 is provided in viewer 101 to detect the bit string in the nonreadable region. Detection module 1401 detects bit string 0 recorded in this nonreadable region, and solution operation module 507 generates a contents key from this bit string 0 and the user key. Subsequent processes are similar to those described above. Therefore, detailed description thereof will not be repeated.

Figure 22A:
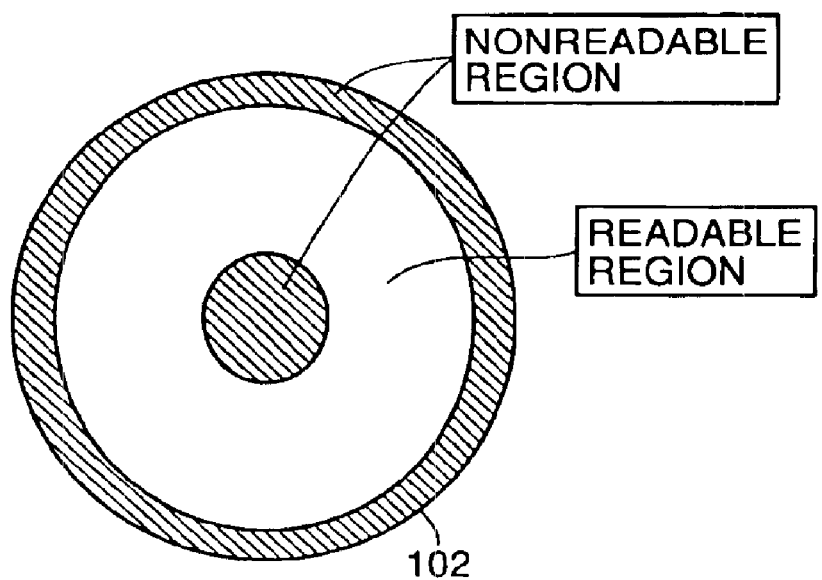
FIGS. 22A and 22B are diagrams to describe the non-readable region provided in medium 102.
Figure 22B:
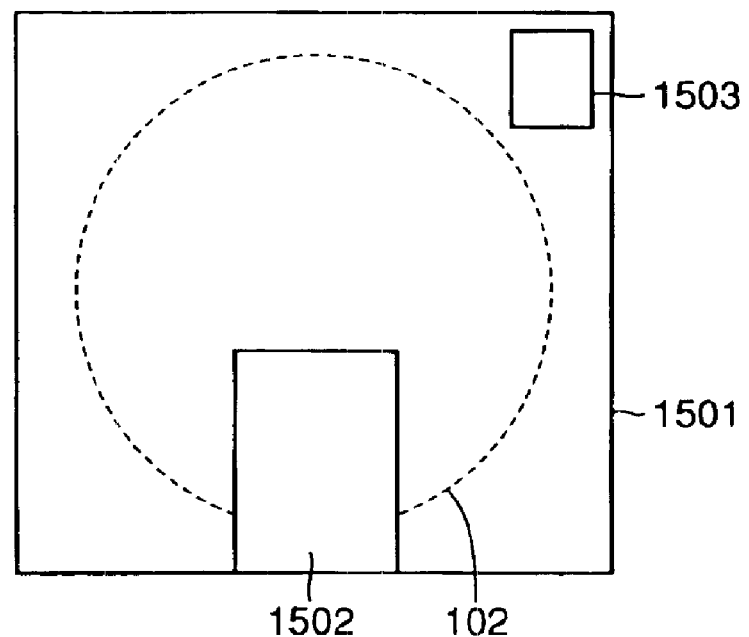

FIGS. 22A and 22B are diagrams to describe the nonreadable region in medium 102. As shown in FIG. 22A, a nonreadable region is provided at the outer circumference of a readable region of a medium 102 taking a disk configuration such as a CD-ROM (Compact Disk-Read Only Memory), a MD (Mini Disk), and the like. The readable region can be read out by a general purpose reader through the normal manipulation of user 106. The nonreadable region cannot be read out by a general purpose reader through the normal manipulation of user 106. For example, a bit string can be recorded at the nonreadable region by writing particular information or pattern at the inner circumference or outer circumference of a disk 102 that cannot have data read out by the general purpose reader. Detection module 1401 detects a bit string recorded in this nonreadable region.

As shown in FIG. 22B, a nonreadable region 1503 can be provided at a case 1501 in which medium 102 is stored. By mounting medium 102 into medium drive 305, a slot 1502 opens so that the contents recorded in medium 102 is read out by a medium disk 305. Nonreadable region 1503 is attached with a bar code seal at case 1501. This is produced by an asperity process. Detection module 1401 detects the bit string recorded in this nonreadable region.

Upon detection of the bit string recorded in the nonreadable region by detection module 1401, the encoded contents is interpreted, reproduced and displayed by the method below.

(1) Another contents key in viewer 101 is rendered valid. That contents key is used by decoded module 508.

(2) The detected bit string is entered into solution operation module 507. A process similar to that of the bit string present in the readable region of medium 102 is carried out. Then, a contents key is generated. That contents key is used by a decode module 508.

Even in the case where the information recorded in the readable region of medium 102 is copied using a general purpose reader, reproduction of the encoded contents is inhibited. Also, control of blurring with respect to the image is carried out by the above-described display control.

According to the electronic copyrighted work distribution system of the present embodiment, the magnification/shrink process and reducing number of colors are applied on the image data according to the display attribute. Therefore, the encoded contents can be reproduced appropriately in the electronic book display apparatus with various display attributes.

An operation is applied on the user key and contents key to produce a bit string at key information management apparatus 110, and a solution operation is applied on that bit string to generate a contents key at the electronic book display device. Therefore, the encoded contents can be reproduced only through a particular electronic book display apparatus. Therefore, illegal copy of the encoded contents and illegal usage of the encoded contents can be prevented.

Since each encoded contents can be reproduced according to the charge account, the contents of an electronic copyrighted work to be provided to the user can be modified in a flexible manner.

Fifth Embodiment

Figure 23:
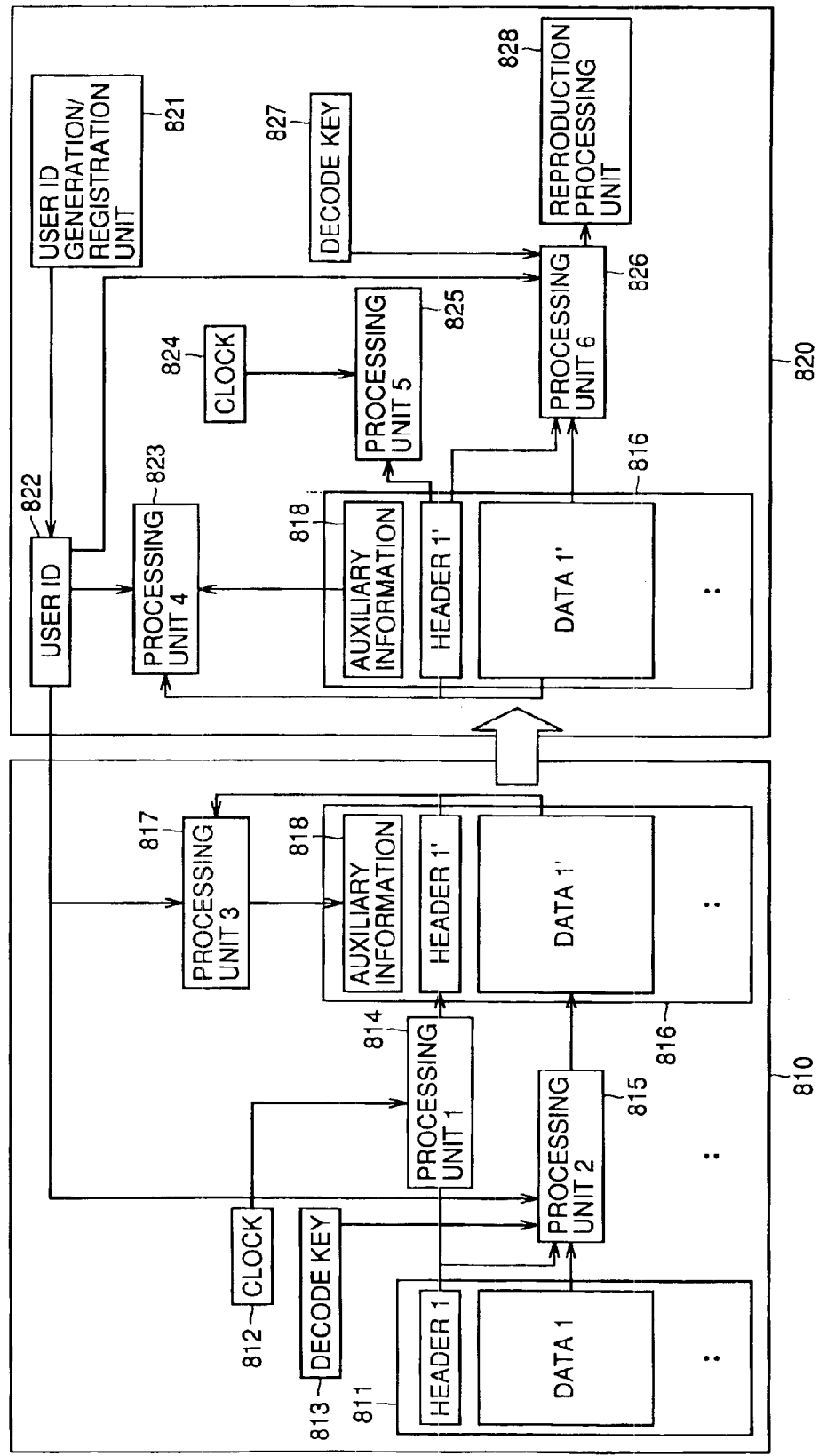
FIG. 23 is a block diagram showing a schematic structure of an electronic copyrighted work distribution management system according to a fifth embodiment of the present invention.

FIG. 23 is a block diagram showing a schematic structure of an electronic copyrighted work distribution management system according to a fifth embodiment of the present invention. This electronic copyrighted work distribution management system includes a vending device 810 and a viewer 820. The structure of vending device 810 and viewer 820 is similar to the structure of vending device 103 shown in FIG. 7 and viewer 101 shown in FIG. 8, respectively. Only the function thereof differs. Therefore, detailed description of the structure of vending device 810 and viewer 820 will not be repeated.

The publisher edits and polishes the copyrighted work. That copyrighted work is converted into an electronic form to produce electronic book data 811. The produced electronic book data 811 is distributed to vending device 810 via a communication line. Electronic book data 811 includes at least one set of the information corresponding to the pair of a vender and data. In the example of FIG. 23, there is a set of a vender 1 and data 1. Although description will be provided hereinafter assuming that vender 1 and data 1 are included in electronic book data 811 as shown in FIG. 23, the process set forth in the following is applied on each set of vender and data, or a representative set of vender and data when there are a plurality of sets of vender and data. Only data 1 may be distributed to the publisher, and vender 1 may be added in the distribution process from the publisher.

Vender 1 includes two types of information corresponding to respective contents. The two information are referred to as information 1 and information 2. The details thereof will be described here.

Information 1 indicates the usage time limit of respective contents. The following three descriptions are present.

(1) The usage time limit is not defined.

(2) Information indicating the usage time limit of the contents is defined. For example, "Until Mar. 31, 1998" is provided.

(3) The period of time of using the contents is defined. For example, one month, one week, two years, or the like is defined.

Information 2 indicates the reproduction processing method executed according to the comparison with a user ID that will be described afterwards. Any of the three types is defined. The user ID is received via communication port 210 shown in FIG. 7, or directly input by the user through user interface 208.

(1) Information indicating that the contents are not reproduced when the user ID does not match.

(2) Information indicating that a process is applied during reproduction when the user ID does not match. When this process is carried out, the reproduction processing method of any of the above-described blurring process by the BLUR process, the noise mixture process by the CHAOS process, or overwriting the displayed contents with the predetermined pattern is specified.

(3) Information indicating that the contents are reproduced properly even if the user ID does not match.

A processing unit 1 (814) obtains information 1 defined at header 1, and carries out the process below according to the contents of information 1.

(1) When the usage time limit is not defined in information 1, processing unit 1 (814) does not carry out any particular process. Header 1 is defined in electronic book data 812 as header 1'.

(2) When the usage time limit is defined in information 1, processing unit 1 (814) does not carry out any particular process, and defines header 1 as header 1' in electronic book data 816.

(3) When the usage period of time is defined in information 1, processing unit 1 (814) obtains the current time from a dock 812 to calculate the usage time limit by adding the usage period of time to the current time. Then, processing unit 1 (814) defines the calculated usage time limit into electronic book data 816 as header 1'.

By the above process, the newly generated header 1' of electronic book data 816 includes information indicating that the usage time limit is not defined or information indicating a usage time limit.

A processing unit 2 (815) obtains information 2 defined at header 1, and carries out the process below according to the contents of information 2.

(1) When information indicating that the contents is not reproduced when the user ID does not match is defined in information 2, processing unit 2 (815) encrypts data 1 with the user ID as the key information to generate and record in electronic book data 816 data 1'.

(2) When information indicating that a process is applied during reproduction when the user ID does not match is defined in information 2, processing unit 2 (815) encrypts data 1 with an encryption key 813 to generate and record in electronic book data 816 data 1'.

(3) When information indicating proper reproduction of the contents even if the user ID does not match is defined in information 2, processing unit 2 (815) encrypts data 1 with encryption key 813 to generate and record in electronic book data 816 data 1'.

Then, a processing unit 3 (817) generates auxiliary information 818 referring to header 1' generated by processing unit 1 (814), data 1' generated by processing unit 2 (815) and the user ID. First, processing unit 3 (817) calculates a hash value from header 1' and data 1' using a hash function. This hash function is the process to convert a long bit string (header 1' and data 1') into a short bit string. For example, the process of adding all the data of header 1' and data 1' to set the least significant 8 bits of the added result as the hash value is envisaged. There is also the existing processing method such as the CRC, SHA-1 or MD5 for the hash function.

Then, processing unit 3 (817) receives the calculated hash value and user ID to calculate auxiliary information by a function F. This function F is a function such as an encryption function of the common key method, for example. With the hash value as the data that is to be subjected to encryption and the user ID as the key for encryption, the auxiliary information is reproduced as below.

Auxiliary information=F (hash value, user ID)

Auxiliary information 818 generated by the above-described process is added to electronic book data 816 and provided to the user. Processing unit 1 (814), processing unit 2 (815) and processing unit 3 (817) are realized by executing the program stored in memory 202 by CPU 201 shown in FIG. 7. The method of providing to the user electronic book data 816 by vending device 810 is similar to that described in the fourth embodiment.

The processing procedure of viewer 820 will be described in detail hereinafter. First, a processing unit 4 (823) calculates a hash value using the hash function from header 1' and data 1' in electronic book data 816 provided by vending device 820. Processing unit 4 (823) calculates the auxiliary information by the aforementioned function F with the calculated hash value and the user ID as the input. Processing unit 4 (823) compares the auxiliary information calculated and auxiliary information 818 stored in electronic book data 816. Determination of "user ID matching" is made when the information match. When the information do not match, determination is made of "user ID mismatch" since the user IDs do not match" may be caused by the falsification of vender 1' or data 1'.

A processing unit 5 (825) obtains information 1 from header 1'. When the usage timer limit is not defined in information 1, reproduction processing unit 828 is commanded to reproduce the encoded contents properly. When the usage time limit is defined in information 1, processing unit 5 (825) refers to clock 824 to compare the current time and the usage time limit. When the current time is before the usage time limit, processing unit 5 (825) commands reproduction processing unit 828 to reproduce the encoded contents properly. When the current time has passed the usage time limit, processing unit 5 (825) commands reproduction processing unit 828 to inhibit reproduction of the encoded contents.

A processing unit 6 (826) obtains information 2 from header 1'. When information 2 corresponds to "information indicating that reproduction of the contents is not carried out when the user ID does not match", the determination result by processing unit 4 (823) is obtained. When the determination result corresponds to "user ID matching", data 1' is decoded with the user ID as the key information. Reproduction processing unit 828 is commanded to reproduce the encoded contents properly. When the determination result indicates "mismatch of user ID", data 1' is not decoded, and reproduction of the encoded contents is not carried out.

When information 2 corresponds to "information indicating application of a process during reproduction when the user ID does not match", processing unit 6 (826) obtains the determination result by processing unit 4 (823). When the determination result corresponds to "match of user ID", data 1 is decoded with decode key 827 as the key information. Reproduction processing unit 828 is commanded to reproduce the encoded contents properly. When the determination result corresponds to "mismatch of user ID", data 1' is decoded with decode key 827 as the key information. Reproduction processing unit 828 is commanded to carry out reproduction by the reproduction processing method defined in information 2 of header 1' when the encoded contents is to be reproduced.

When information 2 corresponds to "information indicating that the contents are to be reproduced properly even if the user ID does not match", processing unit 6 (826) decodes data 1' with decode key 827 as the key information, and commands reproduction processing unit 828 to reproduce the encoded contents properly. Reproduction processing unit 828 carries out reproduction according to the reproduction method of the encoded contents described in the fourth embodiment.

Figure 24:
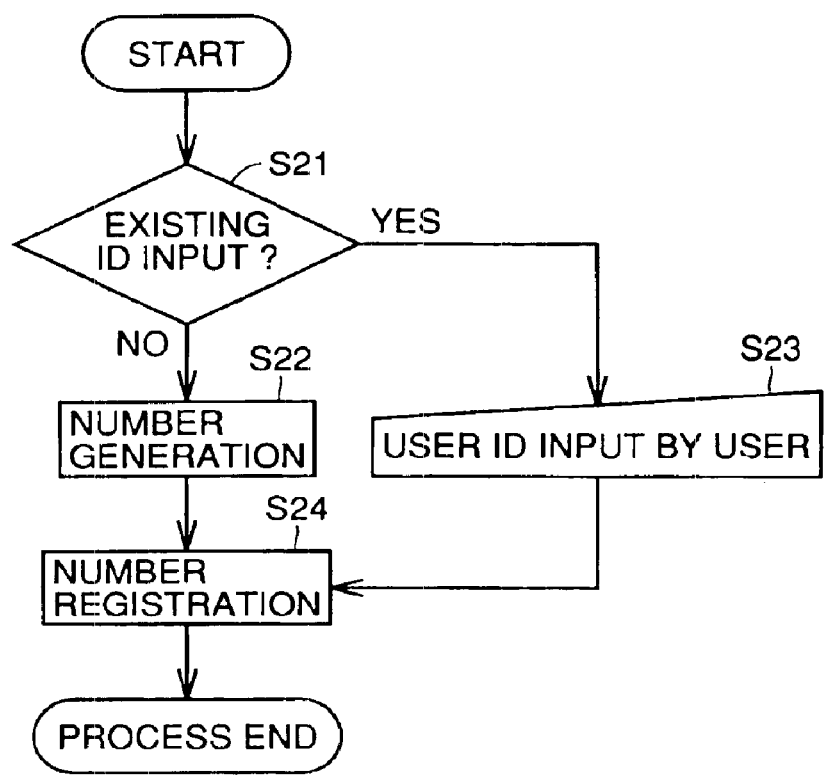
FIG. 24 is a diagram to describe the processing procedure of registering a user ID at viewer 820 of the fifth embodiment of the present invention.

FIG. 24 is a flow chart to describe the procedure of the user ID registration process of viewer 820 in the present embodiment. This process is activated when viewer 820 is reset or when software is installed. When the user ID registration process is activated, confirmation is made whether to use the user ID generated by viewer 820 or to register an existing user ID through the display of LCD 308. When the user designates the usage of the user ID generated by viewer 820 (No in S21), a user ID generation/registration unit 821 automatically generates a user ID using a function with a random number, time information, user name, or the like as the input (S22).

When the user designates registration of an existing user ID (Yes in S21), user ID generation/registration unit 821 obtains a user ID through input unit 309 (S23). User ID generation/registration unit 821 registers the user ID generated automatically at step S22 or the user ID obtained at step S23 (S24). Then, the process ends.

By registering the same user ID for a plurality of viewers 820, illegally copied encoded contents can be reproduced. However, permission of the registration of a user ID by the user at step S23 is based upon the event that one user owns a plurality of viewers 820. Therefore, the process of step S23 can be allowed for only a particular user, and denied for other users. Only the user ID obtained by automatic generation may be registered in viewer 820. Alternatively, the process of step S23 may be denied for all users.

Processing unit 4 (823), processing unit 5 (825) and processing unit 6 (826) can be realized by processing unit 301 of FIG. 8 executing the program stored in RAM 302 or ROM 303.

According to the electronic copyrighted work distribution management system of the present embodiment, vending device 810 calculates a hash value from header 1 and data 1. The hash value is encripted with the input user ID as the key information to generate auxiliary information and added to the electronic book data. Therefore, determination can be made of the match of the user ID by comparing the auxiliary information generated by viewer 820 itself and the auxiliary information added to the electronic book data. It is therefore possible to determine whether it is illegally copied electronic book data or not.

By allowing reproduction of particular encoded contents even if the user ID does not match, the user can carry out trial readout of the contents. Since the reproduction processing method can be specified individually for each encoded contents, the contents capable of trial reading can be specified in a further level.

By the comparison with the current time when the usage time limit or usage period of time is defined in header 1, expiration from the time of purchase is allowed.

Since the user ID is registered based on the automatic generation of a user ID by viewer 820 or by the direct input of an existing user ID, the publisher or the key management center no longer has to administer the user ID. The entire structure of the system can be reduced significantly. Also, the procedure can be simplified.

Furthermore, the manufacturer or the like does not have to assign and register the user ID every time viewer 820 breaks down or is replaced. The procedure can be simplified.

What is claimed is:

1. An electronic copyrighted work sales apparatus comprising:
   a communication unit carrying out data communication with an external source,
   a user interface for a user to select desired contents,
   a storage unit storing contents of an electronic book and a contents identifier in correspondence,
   a communication port to which a user identifier is input, and
   a processing unit extracting from said storage unit a contents identifier corresponding to the contents selected by said user interface, causing said communication unit to transmit said contents identifier and the user identifier input through said communication port to said external source, and providing in a pair auxiliary information to display contents received by said communication unit and the contents of an electronic book selected by said user interface.

2. The electronic copyrighted work sales apparatus according to claim 1, further comprising a charge account processing unit carrying out charge accounting from a user,
   wherein said processing unit alters the contents identifier transmitted by said communication unit according to charge account status by said charge account processing unit.

3. A key information management apparatus comprising:
   a first storage unit storing in correspondence a contents identifier corresponding to contents of an electronic book and a contents key,
   a second storage unit storing in correspondence a user identifier and a user key, and
   a processing unit referring to said first storage unit and said second storage unit to extract a contents key and a user key according to a specified contents identifier and user identifier, and generating auxiliary information to display contents from said extracted contents key and user key.

4. An electronic book display apparatus comprising,
   an input unit to enter auxiliary information to display contents and encoded contents of an electronic book,
   a processing unit generating a contents key from the auxiliary information input by said input unit and a prestored user key, and reproducing encoded contents input by said input unit using said contents key, and
   a display unit displaying the contents reproduced by said processing unit.

5. The electronic book display apparatus according to claim 4, wherein said encoded contents include a plurality of modules including at least one of data and a processing program,
   wherein said processing unit executes said plurality of modules and reproduces said electronic book contents.

6. The electronic book display apparatus according to claim 5, wherein said plurality of modules includes a module with a description of display attribute information,
   wherein said processing unit extracts a display attribute from said module with description of a display attribute, and selectively executes said plurality of modules according to said display attribute.

7. The electronic book display apparatus according to claim 5, wherein said plurality of modules include a module with a description of information indicating the type of contents key,
   wherein said processing unit extracts information indicating the type of contents key from said module with a description of information indicating the type of contents key, and determines whether to execute or not said module according to said information.

8. The electronic book display apparatus according to claim 4, further comprising a recording medium in which auxiliary information to display contents and encoded contents of an electronic book are recorded, wherein said input unit reads out the auxiliary information and the encoded contents of an electronic book recorded in said recording medium.

9. The electronic book display apparatus according to claim 8, wherein said recording medium has said auxiliary information recorded in a nonreadable region.

10. An electronic copyrighted work distribution management system comprising:

an electronic copyrighted work sales apparatus selling an electronic book, a key information management apparatus administering key information of an electronic book that is to be sold by said electronic copyrighted work sales apparatus, and an electronic book display apparatus reproducing and displaying an electronic book sold by said electronic copyrighted work sales apparatus, wherein said electronic copyrighted work sales apparatus includes a user interface for a user to select desired contents, a first storage unit storing in correspondence contents of an electronic book and a contents identifier, a communication port to which a user identifier is input, and a first processing unit extracting from said first storage unit a contents identifier corresponding to the contents selected by said user interface, and providing auxiliary information to display contents and contents of an electronic book selected by said user interface in a pair, wherein said key information management apparatus includes a second storage unit storing in correspondence a contents identifier and a contents key corresponding to contents of an electronic book, a third storage unit storing in correspondence a user identifier and a user key, and a second processing unit referring to said second storage unit and said third storage unit to extract a contents key and user key according to the contents identifier extracted by said first processing unit and a user identifier, and generating auxiliary information to display said contents from said extracted contents key and user key, wherein said electronic book display apparatus includes an input unit to input auxiliary information to display said contents and contents of an electronic book, a third processing unit generating a contents key from auxiliary information input by said input unit and a prestored user key, and reproducing contents input through said input unit using said contents key, and a display unit displaying the contents reproduced by said third processing unit.

11. An electronic copyrighted work sales apparatus comprising a processing unit generating and adding to electronic book data auxiliary information according to the electronic book data and an input user identifier.

12. The electronic copyrighted work sales apparatus according to claim 11, wherein said processing unit comprises a first processing unit carrying out a process according to information defined in a header of input electronic book data and applying the result to electronic book data to be output, a second processing unit encrypting a portion of input electronic book data, and adding the encrypted data to electronic book data to be output, and a third processing unit receiving information including a user identifier, calculating auxiliary information and adding to electronic book data to be output.

13. An electronic book display apparatus comprising:

a first processing unit generating auxiliary information according to electronic book data and a user identifier, and comparing said generated auxiliary information and auxiliary information added to said electronic book data, and a reproduction processing unit determining a reproduction processing method of contents according to a comparison result by said first processing unit and reproducing the contents.

14. The electronic book display apparatus according to claim 13, further comprising a second processing unit comparing usage time limit information defined in a header of said electronic book data with the current time to determine whether to display contents or not and outputting a designation to said reproduction processing unit.

15. The electronic book display apparatus according to claim 13, further comprising a third processing unit determining whether to decode or not an encrypted portion of said electronic book data according to a comparison result by said first processing unit and carrying out a process.

16. The electronic book display apparatus according to claim 13, further comprising a user identifier registration unit registering a user identifier that is automatically generated or input by a user.

17. An electronic book display apparatus comprising:

contents including a plurality of modules with at least one of data and a processing program and a module with a description of display attribute information, a processing unit extracting a display attribute from said module with a description of a display attribute, and selectively executing said plurality of modules according to said display attribute to reproduce said contents, and a display unit displaying contents reproduced by said processing unit.

* * * * *

UNITED STATES PATENT AND TRADEMARK OFFICE
CERTIFICATE OF CORRECTION

PATENT NO. : 6,907,407 B1
APPLICATION NO. : 09/720791
DATED : June 14, 2005
INVENTOR(S) : Masafumi Yamanoue et al.

It is certified that error appears in the above-identified patent and that said Letters Patent is hereby corrected as shown below:

On the title page, item (56), please add the following prior art of record:

6,233,684 B1  5/2001  Stefik et al.
5,586,235 A   12/1996 Kauffman et al.
5,524,201 A   6/1996  Shwarts et al.

In the Claims:

Column 36:
    Claim 1, line 17, after "unit," insert --, wherein the auxiliary information is the hash value of the electronic book's header and content encrypted with the user identifier--;
    Claim 3, line 12, after "key" insert --, wherein the auxiliary information is the hash value of the electronic book's header and content encrypted with the user identifier--;
    Claim 4, line 7, after "key," insert --wherein the auxiliary information is the hash value of the electronic book's header and content encrypted with the user identifier,--;

Column 37:
    Claim 10, line 23, after "pair," insert --wherein the auxiliary information is the hash value of the electronic book's header and content encrypted with the user identifier,--;
    Claim 11, line 4, after "identifier" insert --, wherein the auxiliary information is the hash value of the electronic book's header and content encrypted with the user identifier--;
    Claim 13, line 6, after "data," insert --wherein the auxiliary information is the hash value of the electronic book's header and content encrypted with the user identifier--;

UNITED STATES PATENT AND TRADEMARK OFFICE
CERTIFICATE OF CORRECTION

PATENT NO. : 6,907,407 B1
APPLICATION NO. : 09/720791
DATED : June 14, 2005
INVENTOR(S) : Masafumi Yamanoue et al.

It is certified that error appears in the above-identified patent and that said Letters Patent is hereby corrected as shown below:

Claim 17, please delete this claim in its entirety.

Signed and Sealed this

Thirtieth Day of October, 2007

JON W. DUDAS
*Director of the United States Patent and Trademark Office*